United States Patent
Yoon et al.

(10) Patent No.: US 11,546,568 B1
(45) Date of Patent: Jan. 3, 2023

(54) VIEW SYNTHESIS FOR DYNAMIC SCENES

(71) Applicant: Nvidia Corporation, Santa Clara, CA (US)

(72) Inventors: Jae Shin Yoon, Santa Clara, CA (US); Jan Kautz, Lexington, MA (US); Kihwan Kim, Campbell, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 16/811,356

(22) Filed: Mar. 6, 2020

(51) Int. Cl.
*H04N 13/128* (2018.01)
*H04N 13/00* (2018.01)

(52) U.S. Cl.
CPC ... *H04N 13/128* (2018.05); *H04N 2013/0088* (2013.01)

(58) Field of Classification Search
CPC .. G06K 9/6261; G06K 9/6262; G06K 9/6255; G06K 9/6256; G06K 9/00208
See application file for complete search history.

(56) References Cited

U.S. PATENT DOCUMENTS

| | | | | |
|---|---|---|---|---|
| 2017/0314930 | A1* | 11/2017 | Monterroza | G06N 3/049 |
| 2019/0340775 | A1* | 11/2019 | Lee | G05D 1/024 |
| 2020/0089997 | A1* | 3/2020 | Chaubard | G06V 20/653 |
| 2020/0210779 | A1* | 7/2020 | Atsmon | G06N 3/04 |
| 2020/0302224 | A1* | 9/2020 | Jaganathan | G06N 3/084 |
| 2022/0051425 | A1* | 2/2022 | Busam | G06T 7/73 |
| 2022/0086360 | A1* | 3/2022 | Deng | H04N 13/239 |

OTHER PUBLICATIONS

Diogo Martins, et al., Fusion of stereo and still monocular depth estimates in a self-supervised learning context, May 21/25, 2018, 2018 IEEE ICRA, May 21-25, 2018, 849-856 (Year: 2018).*

* cited by examiner

*Primary Examiner* — Jayanti K Patel
*Assistant Examiner* — Christopher Kingsbury Glover
(74) *Attorney, Agent, or Firm* — Hogan Lovells US LLP

(57) ABSTRACT

Apparatuses, systems, and techniques are presented to perform monocular view synthesis of a dynamic scene. Single and multi-view depth information can be determined for a collection of images of a dynamic scene, and a blender network can be used to combine image features for foreground, background, and missing image regions using fused depth maps inferred form the single and multi-view depth information.

20 Claims, 16 Drawing Sheets

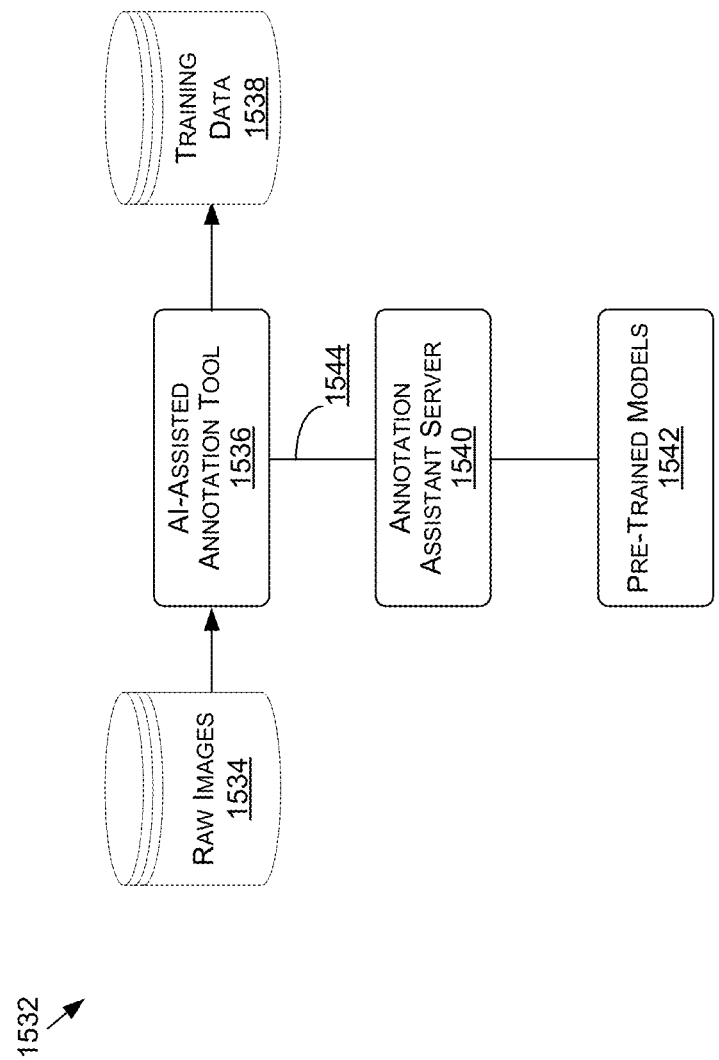

VIEW SYNTHESIS FOR DYNAMIC SCENES

FIELD

At least one embodiment pertains to processing resources used to perform and facilitate artificial intelligence. For example, at least one embodiment pertains to processors or computing systems used to train neural networks according to various novel techniques described herein.

BACKGROUND

Users are increasingly creating and distributing digital content, such as images and video. Oftentimes, images captured of a scene or location will be captured using a single camera with a monocular view. In some instances it may be desirable to synthesize multiple such views or images of a scene, but reconstructing objects or content of a dynamic scene can be challenging, particularly to produce geometrically-coherent view synthesis using this set of two-dimensional images.

BRIEF DESCRIPTION OF THE DRAWINGS

Various embodiments in accordance with the present disclosure will be described with reference to the drawings, in which:

FIG. 15B is an example illustration of a client-server architecture to enhance annotation tools with pre-trained annotation models, in accordance with at least one embodiment.

DETAILED DESCRIPTION

Figure 1:
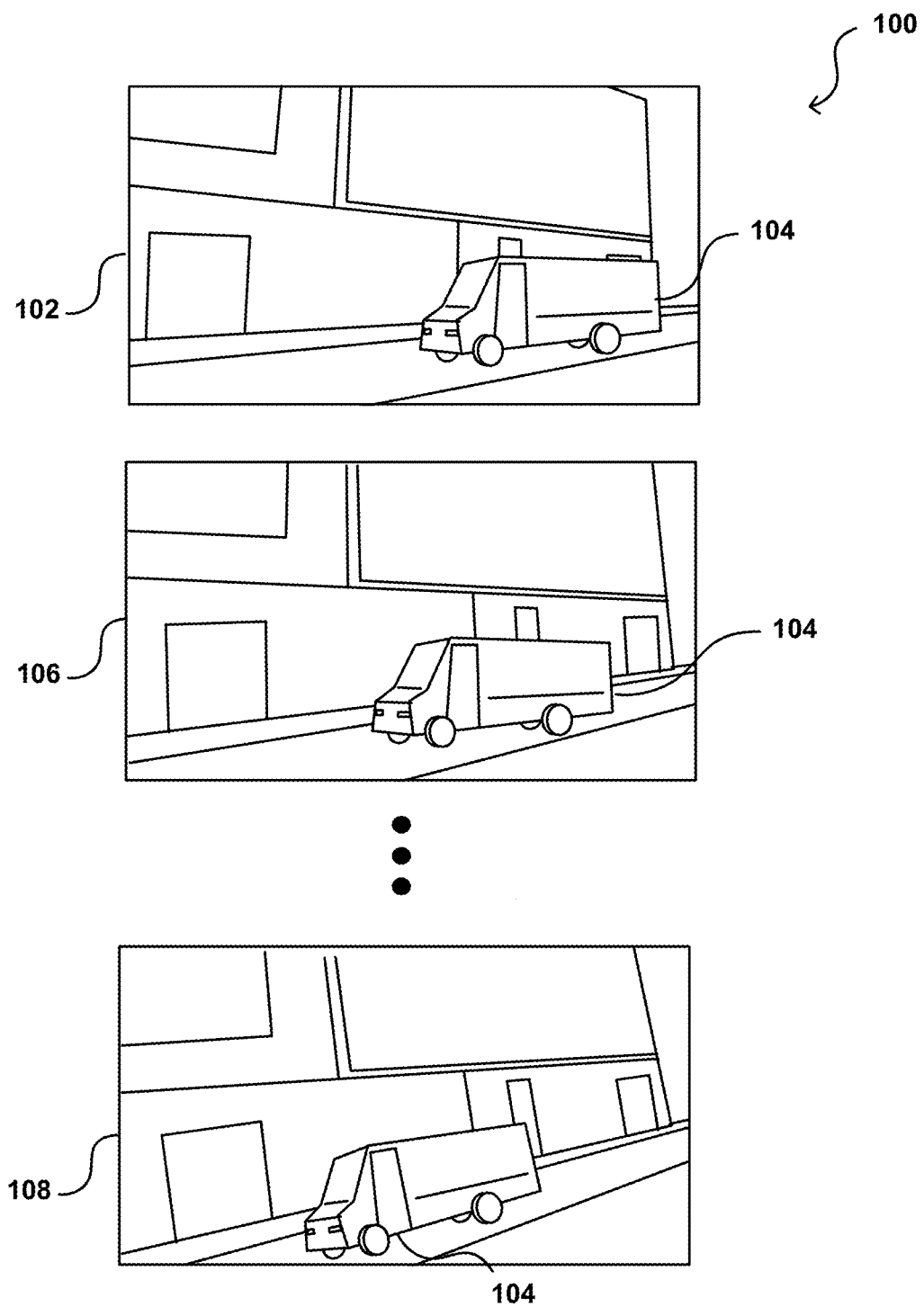
FIG. 1 illustrates a set of monocular images of a dynamic scene, according to at least one embodiment.

FIG. 1 illustrates a set of images 100 that can be captured of a dynamic scene using an image capture device, such as a monocular camera. A monocular camera can have a single lens and sensor that captures two-dimensional images from a point of view of the camera at a given point in time. The camera may be part of a standalone camera or incorporated in a device, such as a smartphone, tablet computer, or wearable device. Each of the images 102, 104, 106 in this series can be captured at a slightly different time, and may in at least some instances also be captured from different points of view, such as where the camera has a different location or orientation. The scene can be considered dynamic, as there may be static background portions or objects, such as the buildings, sidewalk, and road, but there may also be dynamic or movable objects in the scene, such as the truck 104 or pedestrians. The series of images may therefore include motion due to the camera as well motion of objects in the scene. Determining depth and other information from these monocular images can be difficult due in large part to these different movements and the dynamic nature of the scene.

Approaches in accordance with various embodiments can synthesize an image for an arbitrary view and time given a collection of images of a dynamic scene, such as the collection of FIG. 1. A significant challenge for such synthesis arises from dynamic scene reconstruction, where epipolar geometry does not apply to local motion of dynamic contents. In at least one embodiment, although its scale and quality may be inconsistent with other views, depth estimation from a single view can be used to reason about a geometry of local motion. In at least one embodiment, depth information from a single view (DSV) can be combined with a view-invariant depth reconstructed from multiple view data (DMV) obtained by comparing two or more of the images in the collection. Such an approach can utilize one or more neural networks to learn to correct the scale of DSV estimates, as well as to refine each depth with locally consistent motions between views to form a coherent depth estimation. In at least one embodiment, these tasks can be integrated into a depth fusion network in a self-supervised fashion. Fused depth maps can then be used to synthesize a photorealistic virtual view in a specific location and time using a deep blending network that completes the scene and renders the virtual view.

View synthesis can be used for many visual effects and content creation applications, such as cinemagraph, video stabilization, and bullet time visual effect. As mentioned, this synthesized data can be generated in at least one embodiment for dynamic scenes observed from a moving monocular camera. Some monocular view synthesis approaches can be are largely limited to static scenes because they rely on geometric assumptions: in principle, dynamic visual content such as people, pets, and vehicles are considered outliers despite being a major focus in videography on social media and otherwise. Dynamic scene construction can be more challenging, however, as it can require recovering the underlying three-dimensional (3D) geometry of dynamic content from a moving monocular camera, which can be fundamentally. In at least one embodiment, such challenges can be addressed at least in part by leveraging complementary visual and motion cues embedded in videos or image sequences. For example, multi-view images can be combined to reconstruct incomplete yet view-invariant static scene geometry, which enables synthesizing a novel view image of static contents in a globally and geometrically consistent way. Further, relative depth from single view depth estimation provides view-variant yet complete dynamic scene geometry, which allows enforcing locally consistent scene flow for foreground dynamic content.

In at least one embodiment, these cues can be combined by learning a nonlinear scale correction function that can upgrade a time series of single view geometries to form a coherent reconstruction, such as may be referred to as a four-dimensional (4D) reconstruction that reconstructs 3D data over a time period. To disambiguate geometry of the foreground dynamic content, a motion description can be determined in three dimensions, as may correspond to slow and smooth motion, which generates minimal stereoscopic disparity when seen by a specific view while being locally consistent through nearby views.

In at least one embodiment, a scale correction function can be modeled using a depth fusion network that takes input images, view-variant depth from single views (DSVs), and incomplete yet view-invariant depth from a multi-view stereo (DMV) algorithm, and outputs complete and view-invariant depth. In at least one embodiment, this network can be self-supervised using a number of visual signals, including but not limited to: (i) static regions of the DSVs being aligned with a DMV; (ii) output depth of dynamic regions being consistent with relative depth of each DSV; and (iii) estimated scene flow across DSVs being minimal and locally consistent. With the predicted depths that are geometrically consistent across views, a view can be synthesized using a self-supervised rendering network that produces a photorealistic image in the presence of missing data using adversarial training. Such depth prediction of dynamic scenes can be highly effective in generating an unseen image. Further, such a rendering network can seamlessly blend foreground and background image data, which can outperform existing synthesis approaches both quantitatively and qualitatively.

Figure 2:
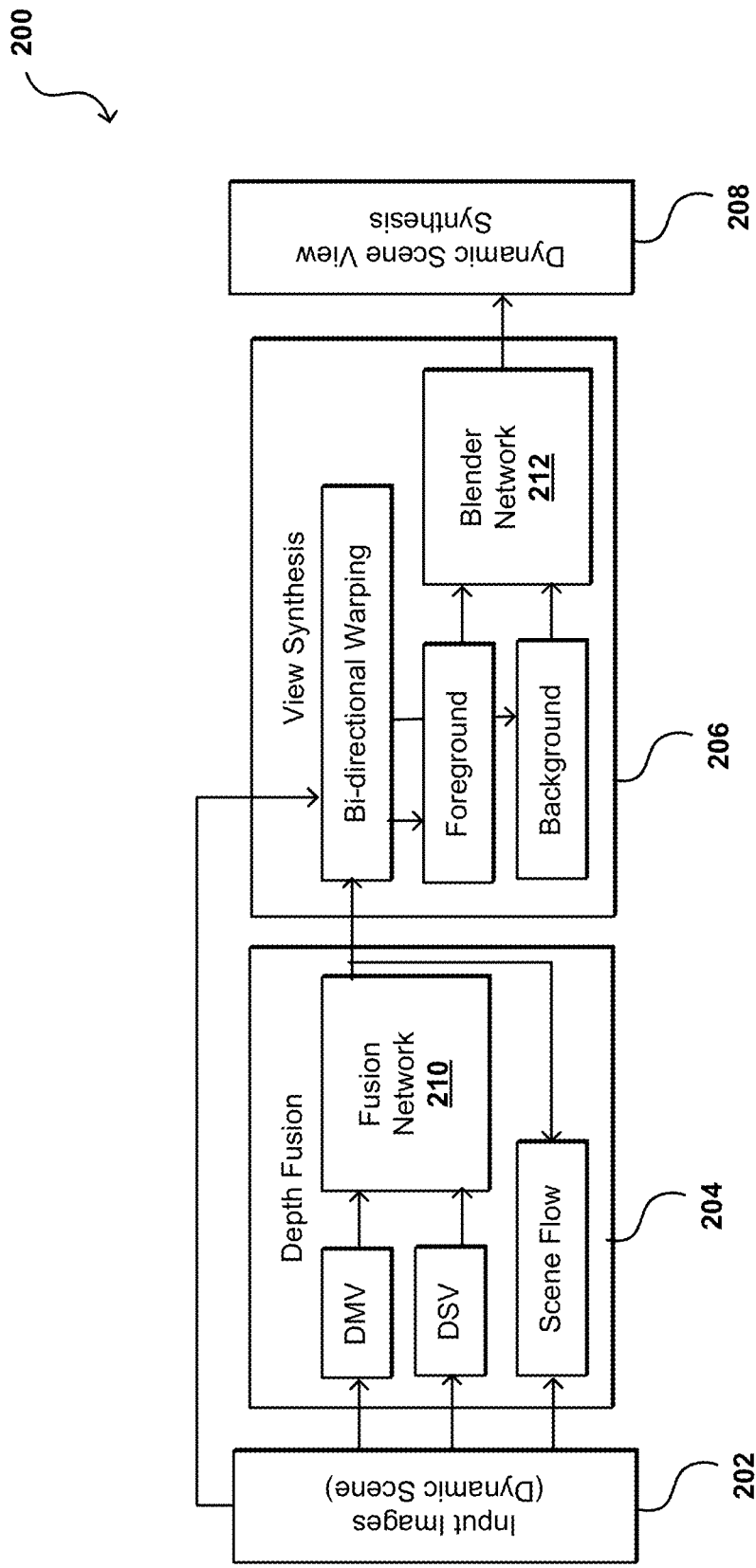
FIG. 2 illustrate components of a first image synthesis network, according to at least one embodiment.

An example pipeline 200 is illustrated in FIG. 2. In this example, images 202 of a dynamic scene are provided as input to a depth fusion module 204. These images 202 are used to fuse, using a fusion network 210, depth from single views (DSVs) and the depth from multi-view image data (DMV) to produce complete view invariant depth by enforcing geometric consistency. The computed depth can be used to synthesize a new dynamic scene view image 208 using a blender network 212 of a view synthesis module 206.

In at least one embodiment, such a synthesis problem can be cast as image warping using underlying 4D reconstruction, as may be given by:

$$J^v(W_{r \to v}(x)) = I^r(x)$$

where $J^v$ is the synthesized image from an arbitrary viewpoint v (v is not limited to the source viewpoints), $W_{r \to v}$ is a warping function, and $I^r$ is the $r^{th}$ observed source image.

For static scene synthesis, a warping function can be given by:

$$y = W_{r \to v}(x; D^r, \Pi^r, \Pi^v)$$

where $\Pi^r$ and $\Pi^v$ are the projection matrices at the $r^{th}$ and $v^{th}$ viewpoints. The warping function reconstructs the view-invariant 3D geometry using the depth ($D^r$) and projection matrix at the r' viewpoint, and projects onto the $v^{th}$ viewpoint to form the warped coordinate y. For instance, this warping function can generate the $i^{th}$ source image from the $j^{th}$ source image, as may be given by $I^i(W_{j \to i}) = I^j$.

For dynamic scene synthesis, a warping function can be generalized to include the time-varying geometry using the depth $D^{r_t}$, as may be given by:

$$y = W_{r_t \to v}(x; D^{r_t}, \Pi^r, \Pi^v)$$

where $r_t$ is the time dependent view index, and t is the time instant. It can be noted that that for a moving monocular camera, the view can be a function of time. Unlike static warping $W_{r \to v}$ above, $W_{r_t \to v}$ cannot synthesize $i^{th}$ source image from the $j^{th}$ source image because of the time-varying geometry $D^{r_t}$, as may be given by $I^i(W_{j \to i}) \neq I^j$.

With these warpings, dynamic scene synthesis can then be expressed as:

$$J = \phi(\{J^v(W_{r \to v})\}_r, J^{v,t}(W_{r_t \to v}); \mathcal{M}^v)$$

where $\{J^v(W_{r \to v})\}_r$ is a set of static scene warping from all source viewpoints, and $J^{v,t}(W_{r_t \to v,t})$ is the warping of dynamic scene from the source image of the $t^{th}$ time instant. $\mathcal{M}^v$ is the set of the coordinates belonging to dynamic contents. $\phi$ is the synthesis function that takes the static and dynamic contents with the corresponding mask to generate a geometrically consistent synthesized image J. In this determination, unknown quantities can include the depth of the time-varying geometry $D^{r_t}$ and the synthesis function $\phi$.

In at least one embodiment, a scale correction function can be used to upgrade a complete view-variant depth $D_s^{r_t}$ from a single view prediction (DSV) to the depth of the view-invariant 3D geometry, as may be given by:

$$D^{r_t} = \psi(D_s^{r_t})$$

where $\psi$ is the scale correction function that can transform the DSV to the ground truth $D^{r_t}$.

In at least one embodiment, upgraded depth for a stationary scene can be identical to the depth $D_m^r$ from view-invariant geometry, such as a multi-view reconstruction (DMV), with uniform scaling, as may be given by $D_m^r = \psi(D_s) = \alpha D_s + \beta$, where $\alpha$ and $\beta$ are scalar and bias, respectively. When a scene is dynamic, such scale and bias regression may not be applicable. In at least one embodiment, a scale correction function can be learned that possesses certain properties. A first such property is that, for static content, the upgraded depth approximates DMV, as may be given by:

$$D_m^r(x) \approx \psi(D_x^{r_t}(x)) \text{ for } x \notin \mathcal{M}^{r_t}$$

where x is the coordinate of pixels belonging to the static background.

Second, for the dynamic contents, the upgraded depth preserves the relative depth from DSV, as may be given by:

$$g(D_s^{r_t}(x)) \approx g(\psi(D_s^{r_t}(x))) \text{ for } x \notin \mathcal{M}^{r_t}$$

where g measures the scale invariant relative gradient of depth, as may be given by:

$$g(D; x, \Delta x) = \frac{D(x + \Delta x) - D(x)}{|D(x + \Delta x)| + |D(x)|}$$

Multi-scale neighbors $x + \Delta x$ can be used to constrain local and global relative gradients.

Third, 3D scene motion induced by the upgraded depths can be smooth and slow, such as minimal scene flow as given by:

$$p(x; D^{r_t}, \Pi^{r_t}) \approx p(F_{r_t \to n_t}(x); D^{n_t}, \Pi^{n_t})$$

where $F_{r_t \to n_t}$ is the optical flow from the $r_t^{th}$ to $n_t^{th}$ images. $p(x; D) \in \mathbb{R}^3$ is the reconstructed point in the world coordinate using the depth D:

$$p(x;D,\Pi) = \psi(D(x))R^T K^{-1}\tilde{x} + C$$

where $\tilde{x}$ is the homogeneous representation of x, and $R \in SO(3)$, $C \in \mathbb{R}^3$, and K are the camera rotation matrix, camera optical center, and camera intrinsic parameters from the projection matrix $\Pi$.

In at least one embodiment, scale correction function $\psi$ using a depth fusion network that takes as input DSV, DMV, and image $I^{r_t}$ can be given by:

$$\hat{D}^{r_t} = \psi(D_s^{r_t}, D_m^{r_t}, I^{r_t}; w)$$

where the network is parametrized by its weights w. To learn w, a loss function such as the following can be minimized:

$$L(w) = L_g + \lambda_l L_l + \lambda_s L_s + \lambda_e L_e$$

where $L_g$ measures a difference between DMV and the estimated depth for static contents, $L_l$ compare a scale invariant depth gradient between DSV and the estimated depth, and $L_s$ minimizes the induced 3D scene motion.

In conjunction with self-supervision, the Laplacian of the estimated depth, can further be minimized, as may be given by:

$$L_e = \|\nabla^2 \hat{D}^{r_t}(x)\|^2 + \lambda_f \|\nabla^2 \hat{D}^{r_t}(y)\|^2$$

where $x \notin \mathcal{M}^{r_t}$, $y \in \mathcal{M}^{r_t}$, and $\lambda_f$ balance spatial smoothness between static and dynamic regions.

Figure 3:
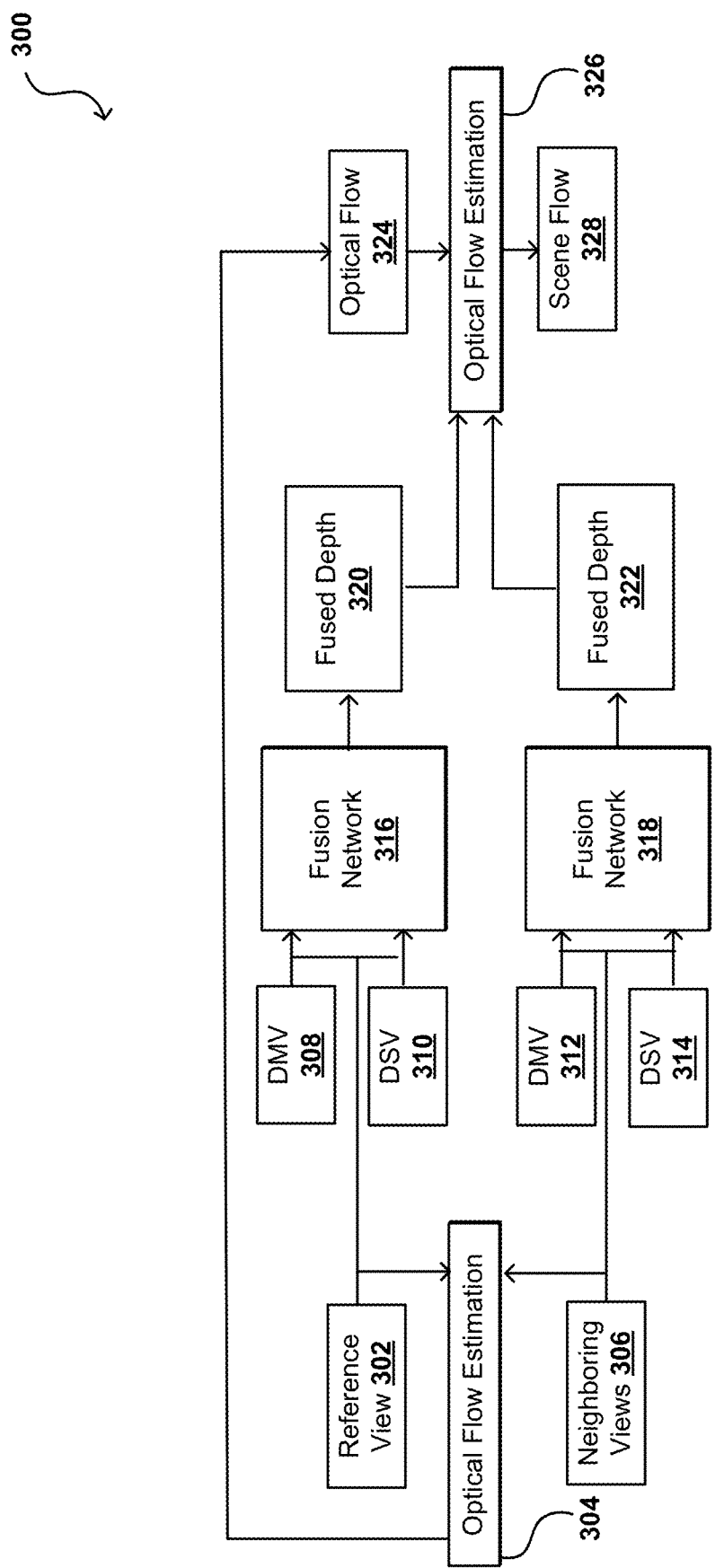
FIG. 3 illustrates components of a second image synthesis network, according to at least one embodiment.

FIG. 3 illustrates components and network architecture for a self-supervision pipeline 300 in accordance with at least one embodiment. In this example, a reference view 302 and one or more neighboring views 306 of a scene are provided as input to one or more fusion networks 316, 318, which can extract visual features from the single and multi-view image data using the same encoder in conjunction with the image. For simplicity, only a reference view and a neighboring view are illustrated, but there can be multiple views from different locations that can be evaluated. If there are ten different images in a collection then depth can be estimated for any or all of those ten different views, starting with a reference view at time 0. With the visual features, the fusion networks can generate a complete and view-invariant fused depth map 320, 322 that is geometrically consistent. To preserve the local visual features, skip connections between the feature extractor and depth generator can be used in at least one embodiment. These depth maps can be using with optical flow estimation 304, 326 and optical flow data 324 to determine scene flow data 328 useful for image synthesis as discussed later herein.

Figure 4:
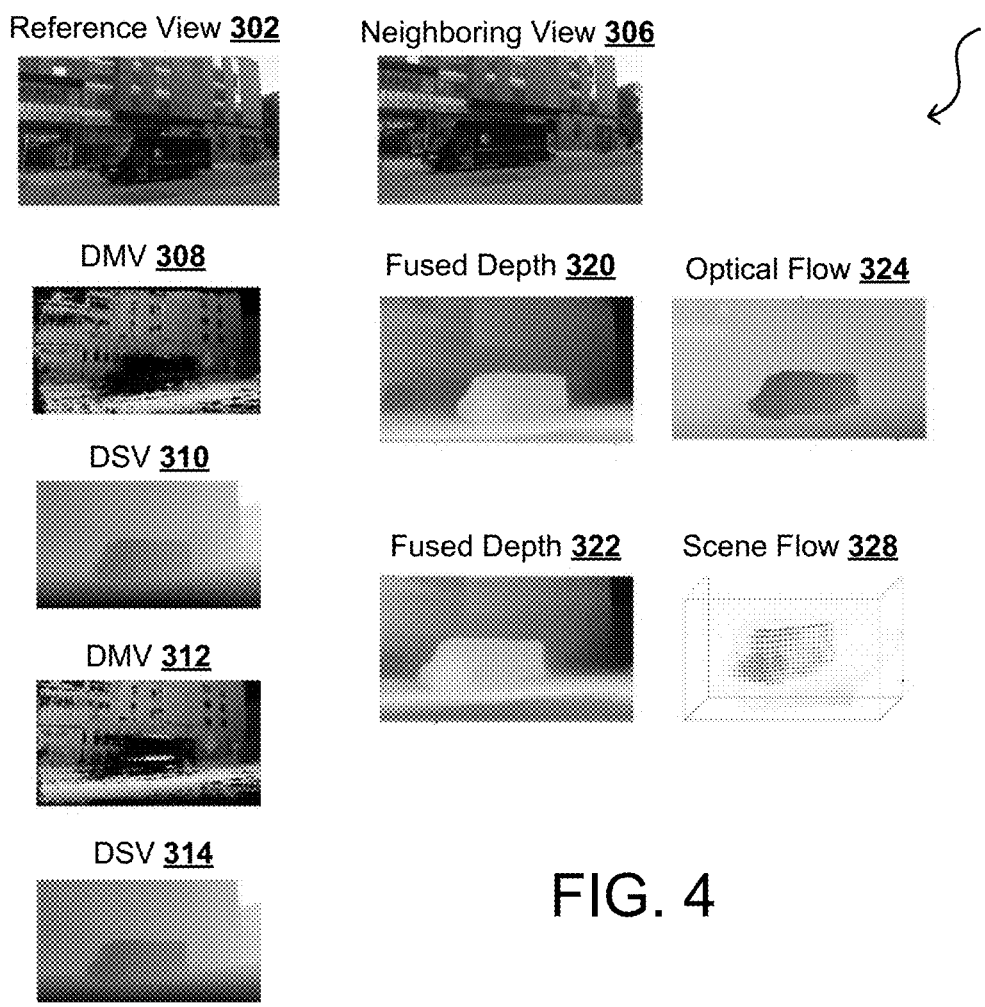
FIG. 4 illustrates images and depth maps of an image synthesis process, according to at least one embodiment.

FIG. 4 illustrates examples of at least some of these images, depth maps, and data instances for a given collection of images. Reference numbers are carried over from FIG. 3 for simplicity of explanation, but this should not be interpreted as a limitation on scope of the various embodiments. FIG. 4 illustrates a reference view 302 and a neighboring view 306 of a scene, with slightly different views and differing locations of one or more objects in the scene. Depth maps 308, 310, 312, 314 generated from these views can be fed to one or more fusion networks, which can produce respective fused depth maps 320, 322 that combine depth data from the single and multi-view depth maps. Optical flow 324 estimated for the reference and neighboring view can be used to infer, or otherwise determine or estimate, scene flow data 328, which can be used with the image data to synthesize a determined view.

Unlike a static scene, there may be regions that are not represented by any source image instance for a dynamic scene to be synthesized synthesis. In at least one embodiment, such missing regions can be completed using a scene rendering network referred to herein as a blender network 506 as illustrated in example synthesis pipeline 500 of FIG. 5. Given a set of warped static scenes from all source views $\{J^v\}_r$, a global background $J_*^v$ can be constructed using a camera baseline. In at least one embodiment, synthesis function $\phi$ can be modeled by:

$$\phi(J_*^v, J^{v,t}; \mathcal{M}^{v,t}) = J_*^v(x) + J^{v,t}(y) + \tilde{\phi}_\theta(J_*^v, J^{v,t})$$

where $x \notin \mathcal{M}^{v,t}$ and $y \in \mathcal{M}^{v,t}$. $\tilde{\phi}_\theta$ is trained to fill the missing regions ($\Delta J$) after combining the foreground and background.

In at least one embodiment, blender network 506 (which can be a trained deep learning network as discussed herein) can take as input a warped dynamic scene $J^{v,t}$ and a globally modeled static scene $J_*^v$ at a virtual view, and output a blending residual $\phi_\theta$ (508). Blending residual 508 combines visual features extracted from the foreground and background to form a decoder with the skip connections. This residual can be learned from real-world images. Each image can be segmented into background and foreground with a corresponding foreground mask. Missing regions can be generated synthetically near a boundary of the foreground mask. With the foreground and background images with missing regions, a blender network 506 can be trained to generate an in-painting residual. In at least one embodiment, an adversarial loss can be incorporated to produce photorealistic image synthesis, as may be given by:

$$L(w_\theta) = L_{rec} + \lambda_{adv} L_{adv}$$

where $L_{rec}$ is the reconstruction loss (difference between the estimated blending residual and ground truth), and $L_{adv}$ is the adversarial loss.

In at least one embodiment, a deep fusion network can be pre-trained on a large-scale synthetic human body dataset, which provides ground-truth optical flow, depth, and moving foreground mask. At individual training iterations, the foreground area can be partially or fully removed, and depth noise can be randomly added on entire scenes. These self-supervision losses can be used to pre-train this network. To avoid depth scale confusion from a network, a normalized inverse depth map of both single and multi-view depths can be used and the scale of the fused depth recovered based on the original scale of the multi-vide depth. When measuring the scale invariant relative depth gradient, a number (e.g., five) of multiscale neighbors (e.g., $\Delta x = \{1, 2, 4, 8, 16\}$) can be taken to consider local and global regions. In one embodiment, PWCNet can be used to compute the optical flow, where the outliers are handled by forward-backward flow consistency. Scene loss flow can be enforced using, for example, ±2 neighboring camera views, such that $r_s = r_t \pm 2$. A foreground mask can be extracted using interactive segmentation tools. These foreground masks can be manually specified for all baselines in an evaluation while existing foreground segmentation approaches can be used as a complementary tool.

Figure 5:
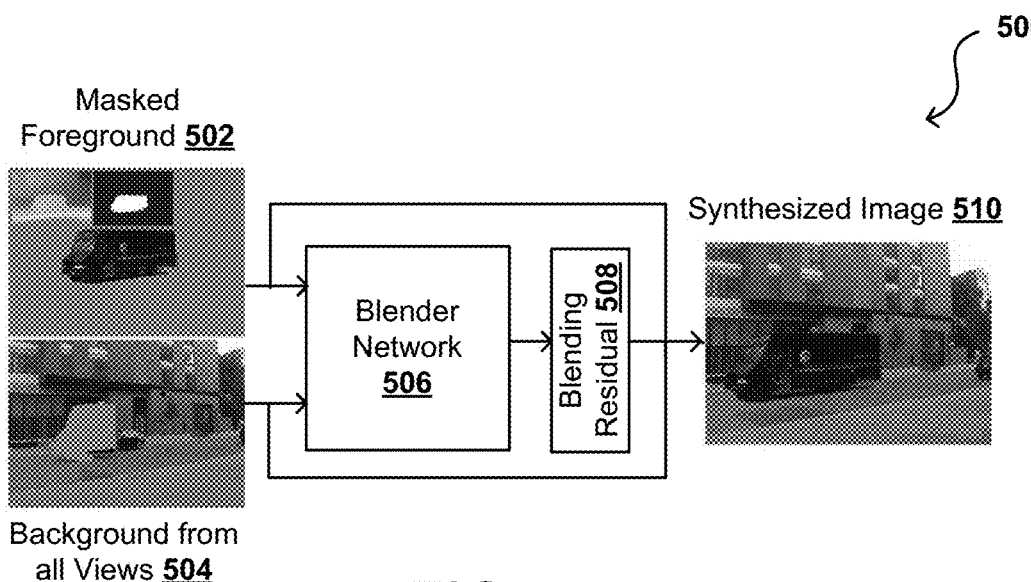
FIG. 5 illustrates components of a synthesis pipeline, in accordance with at least one embodiment.

In at least one embodiment, a blender network 506 can be pre-trained using a video object segmentation dataset. In order to create a synthetic residual, seams and holes around a foreground can be randomly generated using mask morphology and superpixel, with one side of the image boundary being removed up to, for example, 30-pixel thickness. When warping an image to a virtual view, bidirectional warping consistency can be verified to obtain reliable matches. For each warping, the depth can be refined using bilateral weighted median filters. As illustrated in FIG. 5, foreground and background can be handled separately to prevent the depth mixing problem around the object boundary. In at least one embodiment, global background can be composed from all warped backgrounds to a virtual view, with a being found based on a baseline between virtual camera and source cameras.

Figure 6:
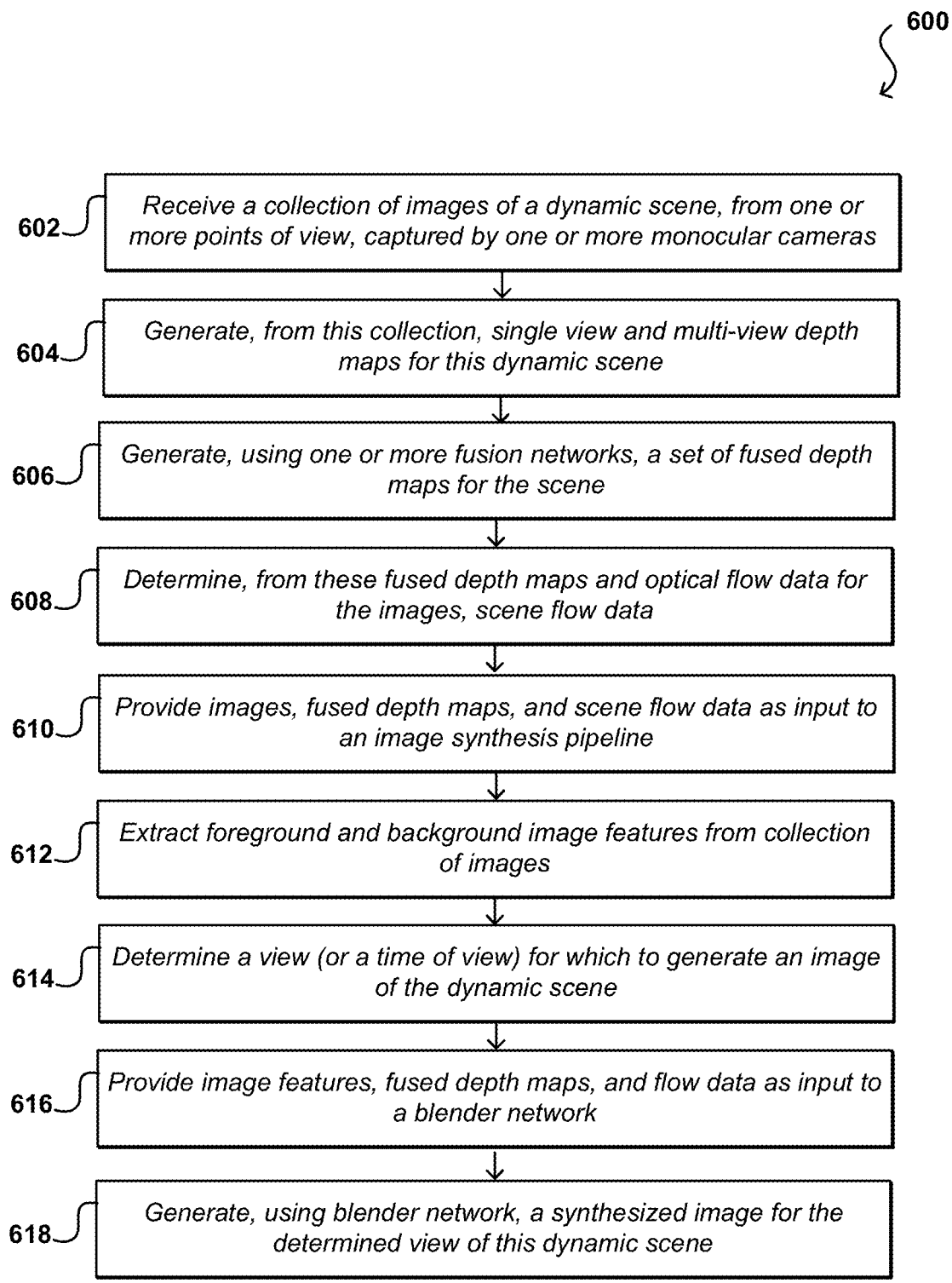
FIG. 6 illustrates a first process for synthesizing image data for a dynamic scene, according to at least one embodiment.

FIG. 6 illustrates an example process 600 that can be used for monocular view synthesis of a dynamic scene in accordance with at least one embodiment. As mentioned, a significant challenge can be to reconstruct dynamic content to produce geometrically-coherent view synthesis. In this example, a collection of images of a dynamic scene can be obtained 602, where those images can be captured from one or more points of view at different points in time using one or more monocular cameras. From this collection, a set of single view and multi-view depth maps can be generated 604, where single view depth can provide accurate depth estimates of foreground objects and multi-view depth can provide accurate depth estimates for background objects or regions. One or more deep fusion networks can be used to generate 606 a set of fused depth maps for this dynamic scene. These can include, for example, foreground depth from single view depth maps blended with background depth from one or more multi-view depth maps. These fused depth maps can be used, along with optical flow data determined from these images, to determine 608 scene flow data. Data for these images, as well as the fused depth maps and scene flow data, can be provided 610 as input to an image synthesis pipeline. Foreground and background image features can be extracted 612 from this collection of images. A view (e.g., for a point of view or time) can be determined 614 for which to generate an image of the dynamic scene. This view can be for a view that is not represented by any of the individual images in the collection, representing a different point of view or time in the dynamic scene. Extracted image features, fused depth maps, and flow data can be provided 616 as input to a blender network. This blender network can then be used to generate 618, or infer, a synthesized image for the determined view of this dynamic scene. In at least one embodiment, a scale correction function can be used that can upgrade depth information from a single view, enabling matching to the depth of a multi-view solution for static content while producing locally-consistent scene motion. In at least one embodiment, a blender network can be designed to combine foreground, background, and missing regions. Any of a number of synthesis algorithms can be used to generate a final output image based on output from blender network 506.

Figure 7:
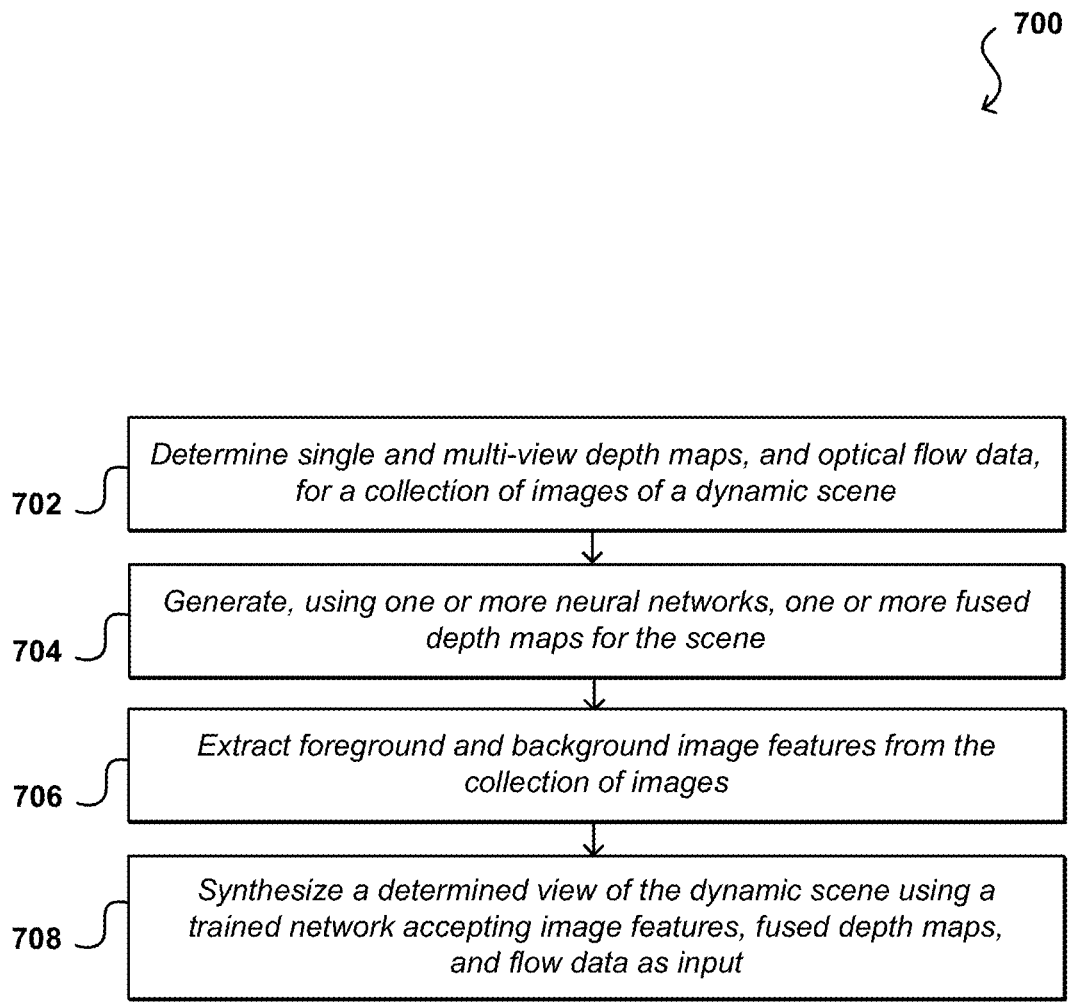
FIG. 7 illustrates a second process for synthesizing image data for a dynamic scene, according to at least one embodiment.

FIG. 7 illustrates another example process 700 for synthesizing a view of a dynamic scene that can be utilized in accordance with at least one embodiment. In this process, single and multi-view depth maps are determined 702, along with optical flow data, for a collection of images of a dynamic scene. These depth maps can be used to generate 704, using one or more neural networks, one or more fused depth maps for this dynamic scene, where the fused maps can fuse foreground depth from single view maps and background depth from multi-view maps. Foreground and background image features can be extracted 706 from this collection of images. A determined view of this dynamic scene can then be synthesized 708 using a trained blender network accepting as input these image features, fused depth maps, and flow data. Multiple such images can be synthesized to generate videos or multiple image views, as may correspond to bullet time or other types of video. In one embodiment, images can be created and used as video frames representative of a determined motion through the dynamic scene, with frames selected according to a desired frame rate of the video.

Inference and Training Logic

Figure 8A:
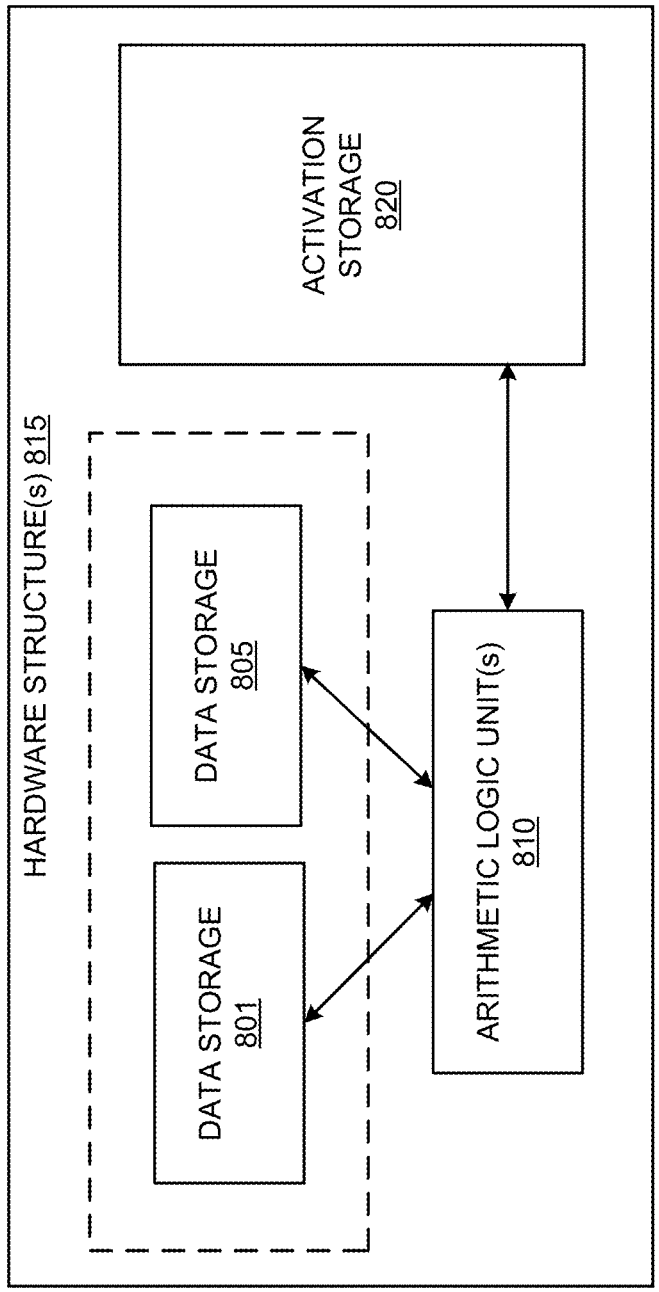
FIGS. 8A and 8B illustrate inference and/or training logic, according to at least one embodiment.

FIG. 8A illustrates inference and/or training logic 815 used to perform inferencing and/or training operations associated with one or more embodiments. Details regarding inference and/or training logic 815 are provided below in conjunction with FIGS. 8A and/or 8B.

In at least one embodiment, inference and/or training logic 815 may include, without limitation, code and/or data storage 801 to store forward and/or output weight and/or input/output data, and/or other parameters to configure neurons or layers of a neural network trained and/or used for inferencing in aspects of one or more embodiments. In at least one embodiment, training logic 815 may include, or be coupled to code and/or data storage 801 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 801 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 801 may be included with other on-chip or off-chip data storage, including a processor's L1, L2, or L3 cache or system memory.

In at least one embodiment, any portion of code and/or data storage 801 may be internal or external to one or more processors or other hardware logic devices or circuits. In at least one embodiment, code and/or code and/or data storage 801 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 801 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 815 may include, without limitation, a code and/or data storage 805 to store backward and/or output weight and/or input/output data corresponding to neurons or layers of a neural network trained and/or used for inferencing in aspects of one or more embodiments. In at least one embodiment, code and/or data storage 805 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 815 may include, or be coupled to code and/or data storage 805 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 805 may be included with other on-chip or off-chip data storage, including a processor's L1, L2, or L3 cache or system memory. In at least one embodiment, any portion of code and/or data storage 805 may be internal or external to on one or more processors or other hardware logic devices or circuits. In at least one embodiment, code and/or data storage 805 may be cache memory, DRAM, SRAM, non-volatile memory (e.g., Flash memory), or other storage. In at least one embodiment, choice of whether code and/or data storage 805 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 801 and code and/or data storage 805 may be separate storage structures. In at least one embodiment, code and/or data storage 801 and code and/or data storage 805 may be same storage structure. In at least one embodiment, code and/or data storage 801 and code and/or data storage 805 may be partially same storage structure and partially separate storage structures. In at least one embodiment, any portion of code and/or data storage 801 and code and/or data storage 805 may be included with other on-chip or off-chip data storage, including a processor's L1, L2, or L3 cache or system memory.

In at least one embodiment, inference and/or training logic 815 may include, without limitation, one or more arithmetic logic unit(s) ("ALU(s)") 810, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 820 that are functions of input/output and/or weight parameter data stored in code and/or data storage 801 and/or code and/or data storage 805. In at least one embodiment, activations stored in activation storage 820 are generated according to linear algebraic and or matrix-based mathematics performed by ALU(s) 810 in response to performing instructions or other code, wherein weight values stored in code and/or data storage 805 and/or code and/or data storage 801 are used as operands along with other values, such as bias values, gradient information, momentum values, or other parameters or hyperparameters, any or all of which may be stored in code and/or data storage 805 or code and/or data storage 801 or another storage on or off-chip.

In at least one embodiment, ALU(s) 810 are included within one or more processors or other hardware logic devices or circuits, whereas in another embodiment, ALU(s) 810 may be external to a processor or other hardware logic device or circuit that uses them (e.g., a co-processor). In at least one embodiment, ALUs 810 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 801, code and/or data storage 805, and activation storage 820 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 820 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 820 may be cache memory, DRAM, SRAM, non-volatile memory (e.g., Flash memory), or other storage. In at least one embodiment, activation storage 820 may be completely or partially within or external to one or more processors or other logical circuits. In at least one embodiment, choice of whether activation storage 820 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 815 illustrated in FIG. 8A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 815 illustrated in FIG. 8A may be used in conjunction with central processing unit ("CPU") hardware, graphics processing unit ("GPU") hardware or other hardware, such as field programmable gate arrays ("FPGAs").

Figure 8B:
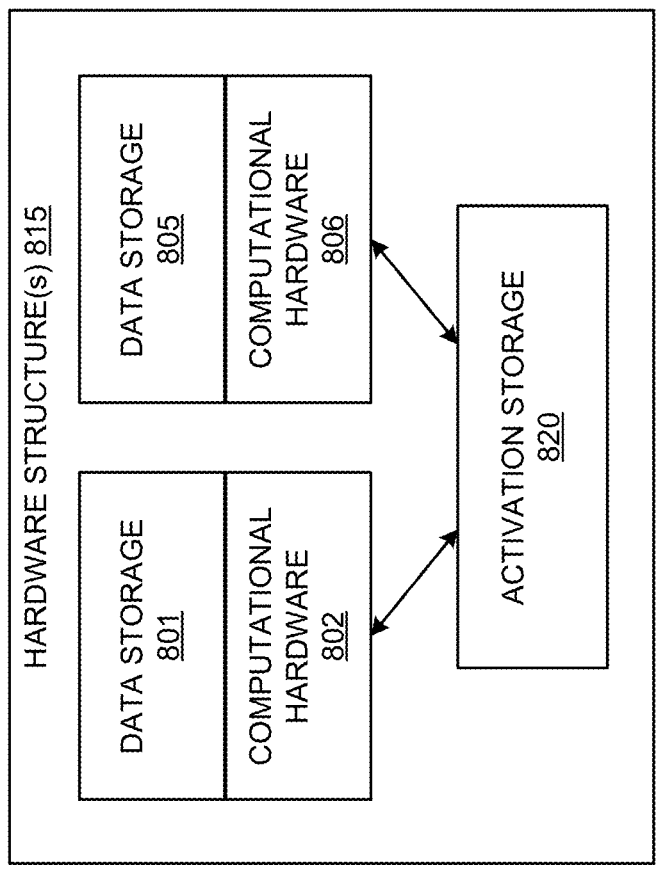

FIG. 8B illustrates inference and/or training logic 815, according to at least one or more embodiments. In at least one embodiment, inference and/or training logic 815 may include, without limitation, hardware logic in which computational resources are dedicated or otherwise exclusively used in conjunction with weight values or other information corresponding to one or more layers of neurons within a neural network. In at least one embodiment, inference and/or training logic 815 illustrated in FIG. 8B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 815 illustrated in FIG. 8B may be used in conjunction with central processing unit (CPU) hardware, graphics processing unit (GPU) hardware or other hardware, such as field programmable gate arrays (FPGAs). In at least one embodiment, inference and/or training logic 815 includes, without limitation, code and/or data storage 801 and code and/or data storage 805, which may be used to store code (e.g., graph code), weight values and/or other information, including bias values, gradient information, momentum values, and/or other parameter or hyperparameter information. In at least one embodiment illustrated in FIG. 8B, each of code and/or data storage 801 and code and/or data storage 805 is associated with a dedicated computational resource, such as computational hardware 802 and computational hardware 806, respectively. In at least one embodiment, each of computational hardware 802 and computational hardware 806 comprises one or more ALUs that perform mathematical functions, such as linear algebraic functions, only on information stored in code and/or data storage 801 and code and/or data storage 805, respectively, result of which is stored in activation storage 820.

In at least one embodiment, each of code and/or data storage 801 and 805 and corresponding computational hardware 802 and 806, respectively, correspond to different layers of a neural network, such that resulting activation from one "storage/computational pair 801/802" of code and/or data storage 801 and computational hardware 802 is provided as an input to "storage/computational pair 805/806" of code and/or data storage 805 and computational hardware 806, in order to mirror conceptual organization of a neural network. In at least one embodiment, each of storage/computational pairs 801/802 and 805/806 may correspond to more than one neural network layer. In at least one embodiment, additional storage/computation pairs (not shown) subsequent to or in parallel with storage computation pairs 801/802 and 805/806 may be included in inference and/or training logic 815.

Data Center

Figure 9:
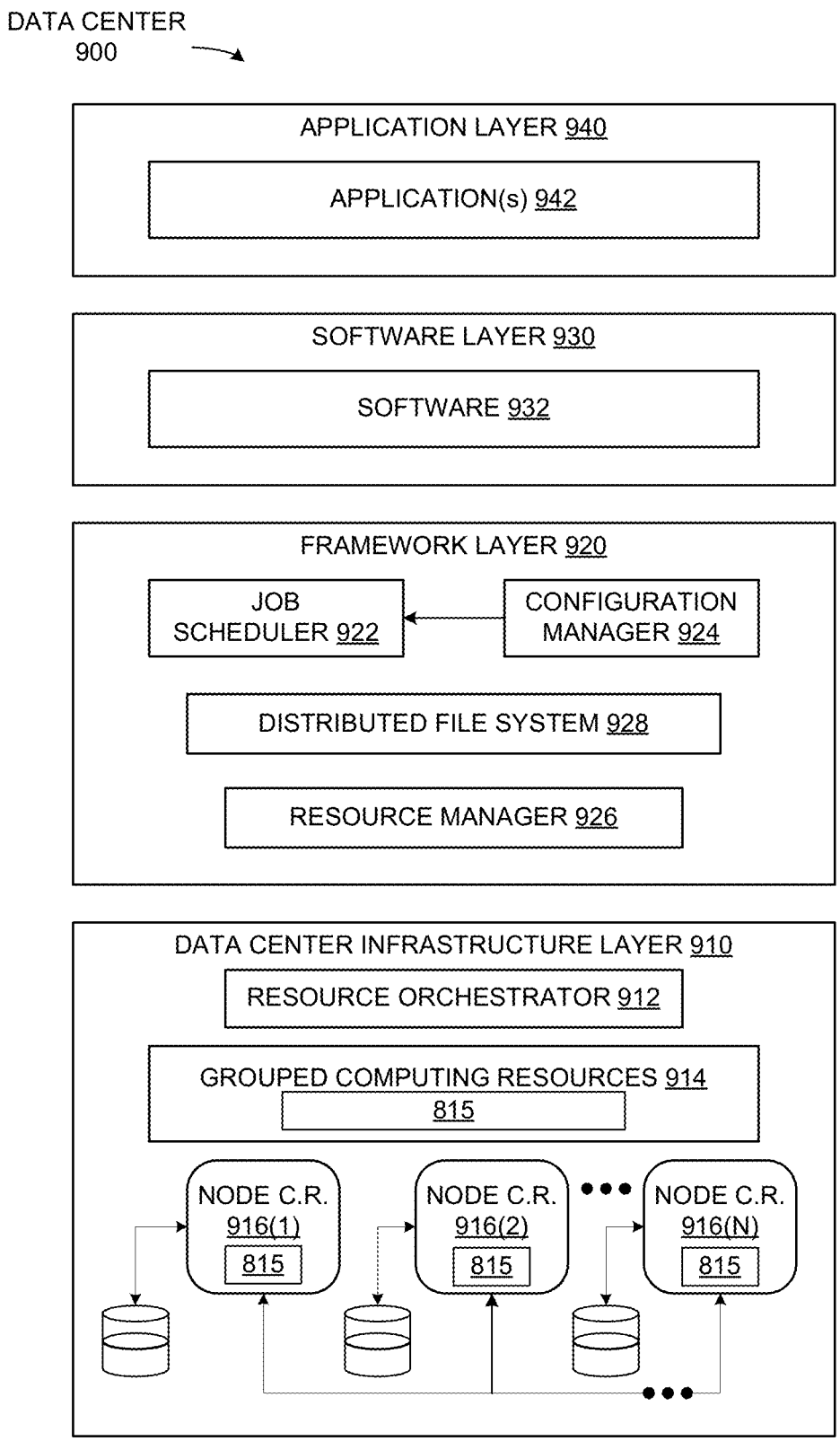
FIG. 9 illustrates an example data center system, according to at least one embodiment.

FIG. 9 illustrates an example data center 900, in which at least one embodiment may be used. In at least one embodiment, data center 900 includes a data center infrastructure layer 910, a framework layer 920, a software layer 930, and an application layer 940.

In at least one embodiment, as shown in FIG. 9, data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 916(1)-916(N) may be a server having one or more of above-mentioned computing resources.

In at least one embodiment, grouped computing resources 914 may include separate groupings of node C.R.s housed within one or more racks (not shown), or many racks housed in data centers at various geographical locations (also not shown). Separate groupings of node C.R.s within grouped computing resources 914 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 912 may configure or otherwise control one or more node C.R.s 916(1)-916(N) and/or grouped computing resources 914. In at least one embodiment, resource orchestrator 912 may include a software design infrastructure ("SDI") management entity for data center 900. In at least one embodiment, resource orchestrator may include hardware, software or some combination thereof.

In at least one embodiment, as shown in FIG. 9, framework layer 920 includes a job scheduler 922, a configuration manager 924, a resource manager 926 and a distributed file system 928. In at least one embodiment, framework layer 920 may include a framework to support software 932 of software layer 930 and/or one or more application(s) 942 of application layer 940. In at least one embodiment, software 932 or application(s) 942 may respectively include web-based service software or applications, such as those provided by Amazon Web Services, Google Cloud and Microsoft Azure. In at least one embodiment, framework layer 920 may be, but is not limited to, a type of free and open-source software web application framework such as Apache Spark™ (hereinafter "Spark") that may utilize distributed file system 928 for large-scale data processing (e.g., "big data"). In at least one embodiment, job scheduler 922 may include a Spark driver to facilitate scheduling of workloads supported by various layers of data center 900. In at least one embodiment, configuration manager 924 may be capable of configuring different layers such as software layer 930 and framework layer 920 including Spark and distributed file system 928 for supporting large-scale data processing. In at least one embodiment, resource manager 926 may be capable of managing clustered or grouped computing resources mapped to or allocated for support of distributed file system 928 and job scheduler 922. In at least one embodiment, clustered or grouped computing resources may include grouped computing resource 914 at data center infrastructure layer 910. In at least one embodiment, resource manager 926 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 928 of framework layer 920. one or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 928 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 924, resource manager 926, and resource orchestrator 912 may implement any number and type of self-modifying actions based on any amount and type of data acquired in any technically feasible fashion. In at least one embodiment, self-modifying actions may relieve a data center operator of data center 900 from making possibly bad configuration decisions and possibly avoiding underutilized and/or poor performing portions of a data center.

In at least one embodiment, data center 900 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 900. In at least one embodiment, trained machine learning models corresponding to one or more neural networks may be used to infer or predict information using resources described above with respect to data center 900 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 815 are used to perform inferencing and/or training operations associated with one or more embodiments. Details regarding inference and/or training logic 815 are provided below in conjunction with FIGS. 8A and/or 8B. In at least one embodiment, inference and/or training logic 815 may be used in system FIG. 9 for inferencing or predicting operations based, at least in part, on weight parameters calculated using neural network training operations, neural network functions and/or architectures, or neural network use cases described herein.

Computer Systems

Figure 10:
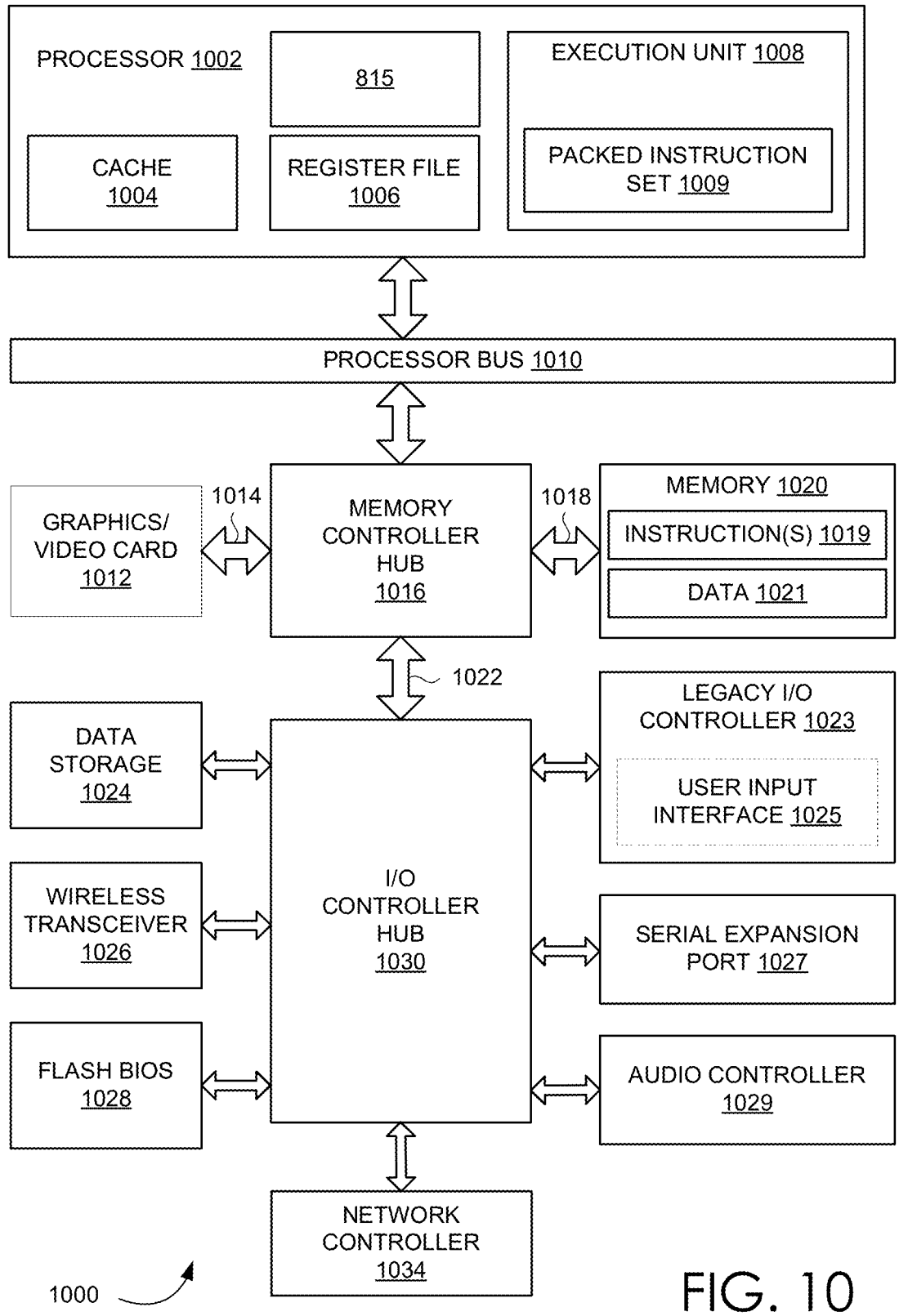
FIG. 10 illustrates a computer system, according to at least one embodiment.

FIG. 10 is a block diagram illustrating an exemplary computer system, which may be a system with interconnected devices and components, a system-on-a-chip (SOC) or some combination thereof 1000 formed with a processor that may include execution units to execute an instruction, according to at least one embodiment. In at least one embodiment, computer system 1000 may include, without limitation, a component, such as a processor 1002 to employ execution units including logic to perform algorithms for process data, in accordance with present disclosure, such as in embodiment described herein. In at least one embodiment, computer system 1000 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 1000 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1000 may include, without limitation, processor 1002 that may include, without limitation, one or more execution units 1008 to perform machine learning model training and/or inferencing according to techniques described herein. In at least one embodiment, computer system 1000 is a single processor desktop or server system, but in another embodiment computer system 1000 may be a multiprocessor system. In at least one embodiment, processor 1002 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1002 may be coupled to a processor bus 1010 that may transmit data signals between processor 1002 and other components in computer system 1000.

In at least one embodiment, processor 1002 may include, without limitation, a Level 1 ("L1") internal cache memory ("cache") 1004. In at least one embodiment, processor 1002 may have a single internal cache or multiple levels of internal cache. In at least one embodiment, cache memory may reside external to processor 1002. Other embodiments may also include a combination of both internal and external caches depending on particular implementation and needs. In at least one embodiment, register file 1006 may store different types of data in various registers including, without limitation, integer registers, floating point registers, status registers, and instruction pointer register.

In at least one embodiment, execution unit 1008, including, without limitation, logic to perform integer and floating point operations, also resides in processor 1002. In at least one embodiment, processor 1002 may also include a microcode ("ucode") read only memory ("ROM") that stores microcode for certain macro instructions. In at least one embodiment, execution unit 1008 may include logic to handle a packed instruction set 1009. In at least one embodiment, by including packed instruction set 1009 in an instruction set of a general-purpose processor 1002, along with associated circuitry to execute instructions, operations used by many multimedia applications may be performed using packed data in a general-purpose processor 1002. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 1008 may also be used in microcontrollers, embedded processors, graphics devices, DSPs, and other types of logic circuits. In at least one embodiment, computer system 1000 may include, without limitation, a memory 1020. In at least one embodiment, memory 1020 may be implemented as a Dynamic Random Access Memory ("DRAM") device, a Static Random Access Memory ("SRAM") device, flash memory device, or other memory device. In at least one embodiment, memory 1020 may store instruction(s) 1019 and/or data 1021 represented by data signals that may be executed by processor 1002.

In at least one embodiment, system logic chip may be coupled to processor bus 1010 and memory 1020. In at least one embodiment, system logic chip may include, without limitation, a memory controller hub ("MCH") 1016, and processor 1002 may communicate with MCH 1016 via processor bus 1010. In at least one embodiment, MCH 1016 may provide a high bandwidth memory path 1018 to memory 1020 for instruction and data storage and for storage of graphics commands, data and textures. In at least one embodiment, MCH 1016 may direct data signals between processor 1002, memory 1020, and other components in computer system 1000 and to bridge data signals between processor bus 1010, memory 1020, and a system I/O 1022. In at least one embodiment, system logic chip may provide a graphics port for coupling to a graphics controller. In at least one embodiment, MCH 1016 may be coupled to memory 1020 through a high bandwidth memory path 1018 and graphics/video card 1012 may be coupled to MCH 1016 through an Accelerated Graphics Port ("AGP") interconnect 1014.

In at least one embodiment, computer system 1000 may use system I/O 1022 that is a proprietary hub interface bus to couple MCH 1016 to I/O controller hub ("ICH") 1030. In at least one embodiment, ICH 1030 may provide direct connections to some I/O devices via a local I/O bus. In at least one embodiment, local I/O bus may include, without limitation, a high-speed I/O bus for connecting peripherals to memory 1020, chipset, and processor 1002. Examples may include, without limitation, an audio controller 1029, a firmware hub ("flash BIOS") 1028, a wireless transceiver 1026, a data storage 1024, a legacy I/O controller 1023 containing user input and keyboard interfaces 1025, a serial expansion port 1027, such as Universal Serial Bus ("USB"), and a network controller 1034. data storage 1024 may comprise a hard disk drive, a floppy disk drive, a CD-ROM device, a flash memory device, or other mass storage device.

In at least one embodiment, FIG. 10 illustrates a system, which includes interconnected hardware devices or "chips", whereas in other embodiments, FIG. 10A may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 1000 are interconnected using compute express link (CXL) interconnects.

Inference and/or training logic 815 are used to perform inferencing and/or training operations associated with one or more embodiments. Details regarding inference and/or training logic 815 are provided below in conjunction with FIGS. 8A and/or 8B. In at least one embodiment, inference and/or training logic 815 may be used in system FIG. 10A for inferencing or predicting operations based, at least in part, on weight parameters calculated using neural network training operations, neural network functions and/or architectures, or neural network use cases described herein.

Figure 11:
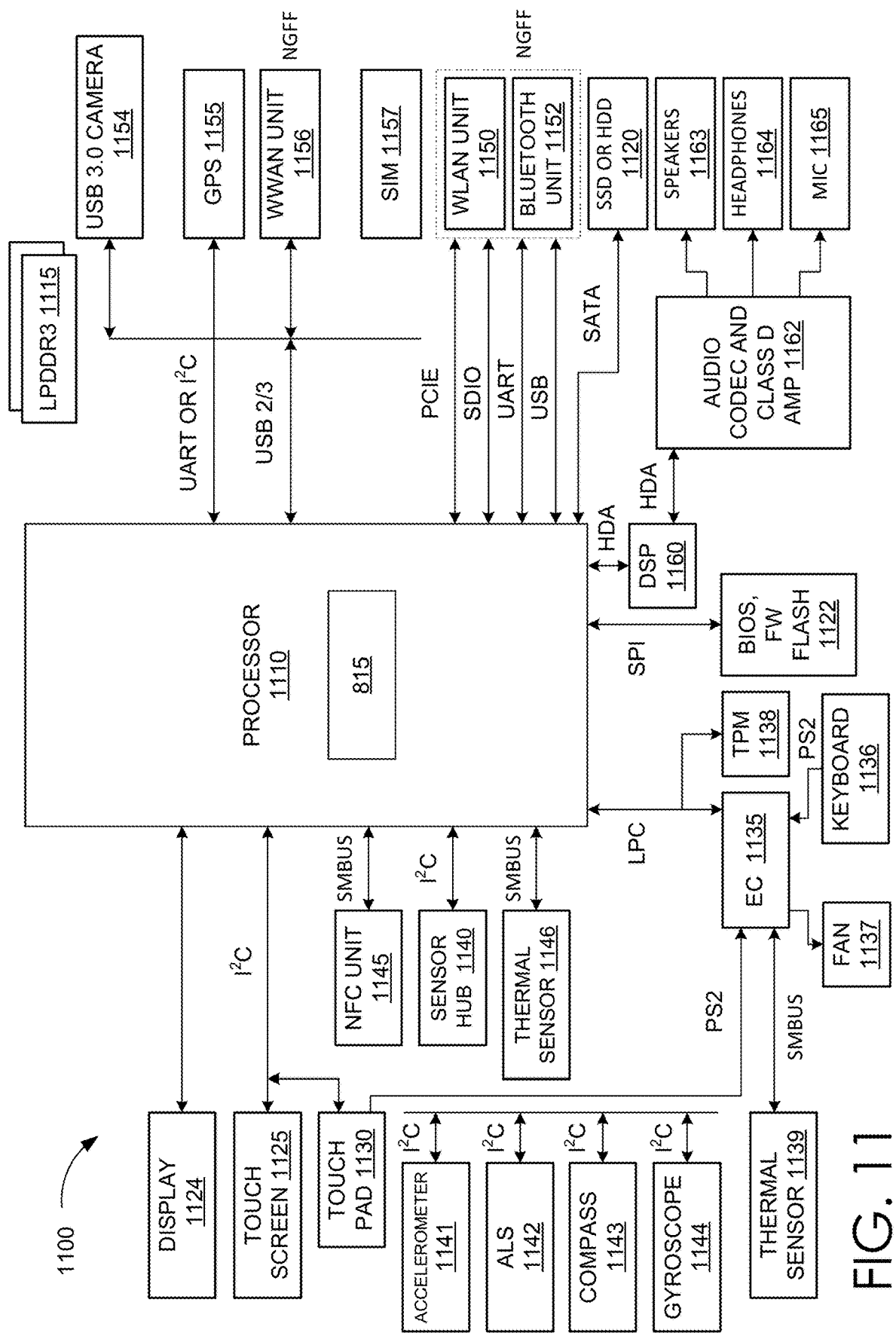
FIG. 11 illustrates a computer system, according to at least one embodiment.

FIG. 11 is a block diagram illustrating an electronic device 1100 for utilizing a processor 1110, according to at least one embodiment. In at least one embodiment, electronic device 1100 may be, for example and without limitation, a notebook, a tower server, a rack server, a blade server, a laptop, a desktop, a tablet, a mobile device, a phone, an embedded computer, or any other suitable electronic device.

In at least one embodiment, system 1100 may include, without limitation, processor 1110 communicatively coupled to any suitable number or kind of components, peripherals, modules, or devices. In at least one embodiment, processor 1110 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 11 illustrates a system, which includes interconnected hardware devices or "chips", whereas in other embodiments, FIG. 11 may illustrate an exemplary System on a Chip ("SoC"). In at least one embodiment, devices illustrated in FIG. 11 may be interconnected with proprietary interconnects, standardized interconnects (e.g., PCIe) or some combination thereof. In at least one embodiment, one or more components of FIG. 11 are interconnected using compute express link (CXL) interconnects.

In at least one embodiment, FIG. 11 may include a display 1124, a touch screen 1125, a touch pad 1130, a Near Field Communications unit ("NFC") 1145, a sensor hub 1140, a thermal sensor 1146, an Express Chipset ("EC") 1135, a Trusted Platform Module ("TPM") 1138, BIOS/firmware/flash memory ("BIOS, FW Flash") 1122, a DSP 1160, a drive 1120 such as a Solid State Disk ("SSD") or a Hard Disk Drive ("HDD"), a wireless local area network unit ("WLAN") 1150, a Bluetooth unit 1152, a Wireless Wide Area Network unit ("WWAN") 1156, a Global Positioning System (GPS) 1155, a camera ("USB 3.0 camera") 1154 such as a USB 3.0 camera, and/or a Low Power Double Data Rate ("LPDDR") memory unit ("LPDDR3") 1115 implemented in, for example, LPDDR3 standard. These components may each be implemented in any suitable manner.

In at least one embodiment, other components may be communicatively coupled to processor 1110 through components discussed above. In at least one embodiment, an accelerometer 1141, Ambient Light Sensor ("ALS") 1142, compass 1143, and a gyroscope 1144 may be communicatively coupled to sensor hub 1140. In at least one embodiment, thermal sensor 1139, a fan 1137, a keyboard 1146, and a touch pad 1130 may be communicatively coupled to EC 1135. In at least one embodiment, speaker 1163, headphones 1164, and microphone ("mic") 1165 may be communicatively coupled to an audio unit ("audio codec and class d amp") 1162, which may in turn be communicatively coupled to DSP 1160. In at least one embodiment, audio unit 1164 may include, for example and without limitation, an audio coder/decoder ("codec") and a class D amplifier. In at least one embodiment, SIM card ("SIM") 1157 may be communicatively coupled to WWAN unit 1156. In at least one embodiment, components such as WLAN unit 1150 and Bluetooth unit 1152, as well as WWAN unit 1156 may be implemented in a Next Generation Form Factor ("NGFF").

Inference and/or training logic 815 are used to perform inferencing and/or training operations associated with one or more embodiments. Details regarding inference and/or training logic 815 are provided below in conjunction with FIGS. 8A and/or 8B. In at least one embodiment, inference and/or training logic 815 may be used in system FIG. 11 for inferencing or predicting operations based, at least in part, on weight parameters calculated using neural network training operations, neural network functions and/or architectures, or neural network use cases described herein.

Figure 12:
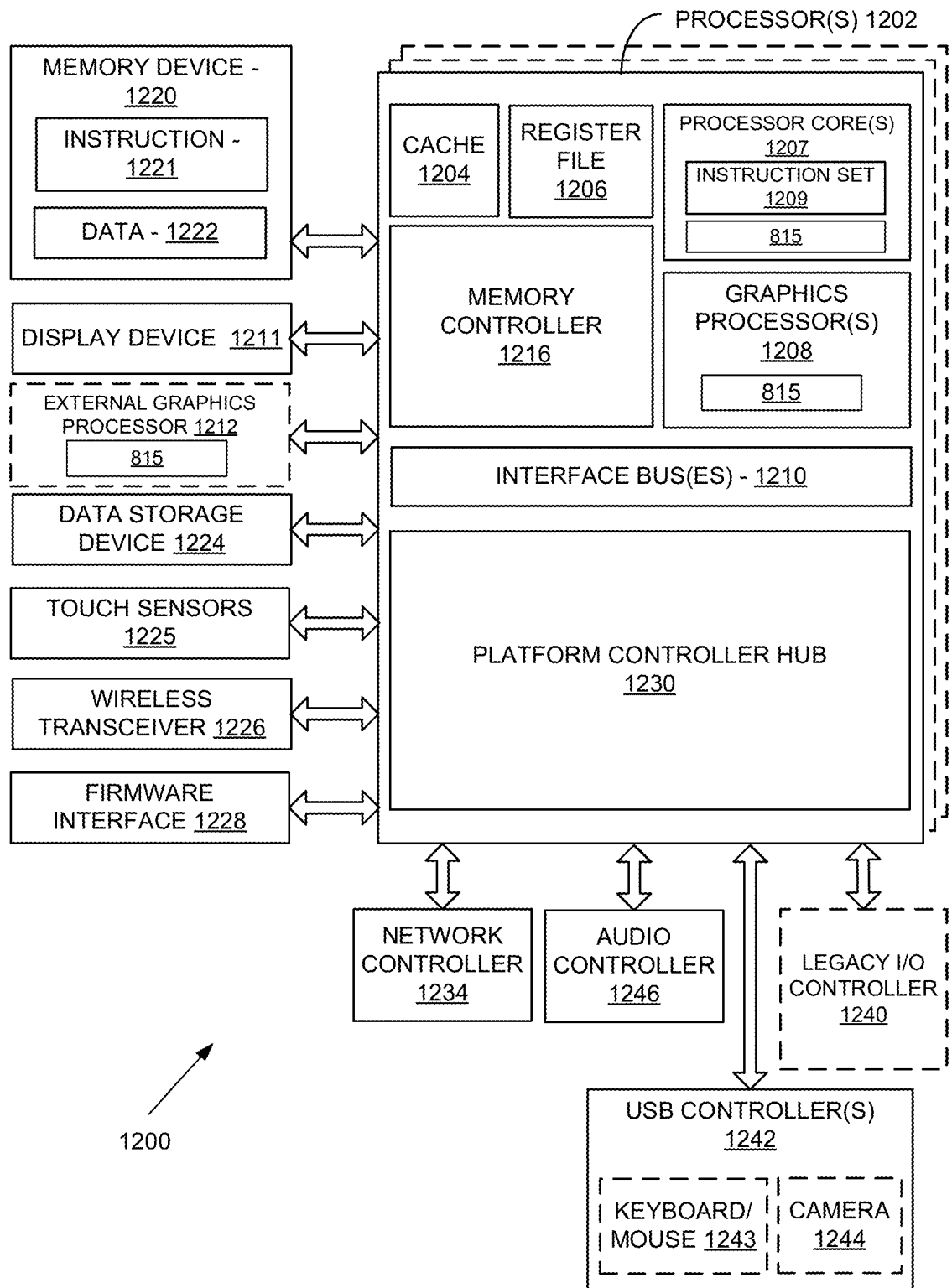
FIG. 12 illustrates at least a portion of a graphics processor, according to one or more embodiments.

FIG. 12 is a block diagram of a processing system, according to at least one embodiment. In at least one embodiment, system 1200 includes one or more processors 1202 and one or more graphics processors 1208, and may be a single processor desktop system, a multiprocessor workstation system, or a server system having a large number of processors 1202 or processor cores 1207. In at least one embodiment, system 1200 is a processing platform incorporated within a system-on-a-chip (SoC) integrated circuit for use in mobile, handheld, or embedded devices.

In at least one embodiment, system 1200 can include, or be incorporated within a server-based gaming platform, a game console, including a game and media console, a mobile gaming console, a handheld game console, or an online game console. In at least one embodiment, system 1200 is a mobile phone, smart phone, tablet computing device or mobile Internet device. In at least one embodiment, processing system 1200 can also include, couple with, or be integrated within a wearable device, such as a smart watch wearable device, smart eyewear device, augmented reality device, or virtual reality device. In at least one embodiment, processing system 1200 is a television or set top box device having one or more processors 1202 and a graphical interface generated by one or more graphics processors 1208.

In at least one embodiment, one or more processors 1202 each include one or more processor cores 1207 to process instructions which, when executed, perform operations for system and user software. In at least one embodiment, each of one or more processor cores 1207 is configured to process a specific instruction set 1209. In at least one embodiment, instruction set 1209 may facilitate Complex Instruction Set Computing (CISC), Reduced Instruction Set Computing (RISC), or computing via a Very Long Instruction Word (VLIW). In at least one embodiment, processor cores 1207 may each process a different instruction set 1209, which may include instructions to facilitate emulation of other instruction sets. In at least one embodiment, processor core 1207 may also include other processing devices, such a Digital Signal Processor (DSP).

In at least one embodiment, processor 1202 includes cache memory 1204. In at least one embodiment, processor 1202 can have a single internal cache or multiple levels of internal cache. In at least one embodiment, cache memory is shared among various components of processor 1202. In at least one embodiment, processor 1202 also uses an external cache (e.g., a Level-3 (L3) cache or Last Level Cache (LLC)) (not shown), which may be shared among processor cores 1207 using known cache coherency techniques. In at least one embodiment, register file 1206 is additionally included in processor 1202 which may include different types of registers for storing different types of data (e.g., integer registers, floating point registers, status registers, and an instruction pointer register). In at least one embodiment, register file 1206 may include general-purpose registers or other registers.

In at least one embodiment, one or more processor(s) 1202 are coupled with one or more interface bus(es) 1210 to transmit communication signals such as address, data, or control signals between processor 1202 and other components in system 1200. In at least one embodiment, interface bus 1210, in one embodiment, can be a processor bus, such as a version of a Direct Media Interface (DMI) bus. In at least one embodiment, interface 1210 is not limited to a DMI bus, and may include one or more Peripheral Component Interconnect buses (e.g., PCI, PCI Express), memory busses, or other types of interface busses. In at least one embodiment processor(s) 1202 include an integrated memory controller 1216 and a platform controller hub 1230. In at least one embodiment, memory controller 1216 facilitates communication between a memory device and other components of system 1200, while platform controller hub (PCH) 1230 provides connections to I/O devices via a local I/O bus.

In at least one embodiment, memory device 1220 can be a dynamic random access memory (DRAM) device, a static random access memory (SRAM) device, flash memory device, phase-change memory device, or some other memory device having suitable performance to serve as process memory. In at least one embodiment memory device 1220 can operate as system memory for system 1200, to store data 1222 and instructions 1221 for use when one or more processors 1202 executes an application or process. In at least one embodiment, memory controller 1216 also couples with an optional external graphics processor 1212, which may communicate with one or more graphics processors 1208 in processors 1202 to perform graphics and media operations. In at least one embodiment, a display device 1211 can connect to processor(s) 1202. In at least one embodiment display device 1211 can include one or more of an internal display device, as in a mobile electronic device or a laptop device or an external display device attached via a display interface (e.g., DisplayPort, etc.). In at least one embodiment, display device 1211 can include a head mounted display (HMD) such as a stereoscopic display device for use in virtual reality (VR) applications or augmented reality (AR) applications.

In at least one embodiment, platform controller hub 1230 enables peripherals to connect to memory device 1220 and processor 1202 via a high-speed I/O bus. In at least one embodiment, I/O peripherals include, but are not limited to, an audio controller 1246, a network controller 1234, a firmware interface 1228, a wireless transceiver 1226, touch sensors 1225, a data storage device 1224 (e.g., hard disk drive, flash memory, etc.). In at least one embodiment, data storage device 1224 can connect via a storage interface (e.g., SATA) or via a peripheral bus, such as a Peripheral Component Interconnect bus (e.g., PCI, PCI Express). In at least one embodiment, touch sensors 1225 can include touch screen sensors, pressure sensors, or fingerprint sensors. In at least one embodiment, wireless transceiver 1226 can be a Wi-Fi transceiver, a Bluetooth transceiver, or a mobile network transceiver such as a 3G, 4G, or Long Term Evolution (LTE) transceiver. In at least one embodiment, firmware interface 1228 enables communication with system firmware, and can be, for example, a unified extensible firmware interface (UEFI). In at least one embodiment, network controller 1234 can enable a network connection to a wired network. In at least one embodiment, a high-performance network controller (not shown) couples with interface bus 1210. In at least one embodiment, audio controller 1246 is a multi-channel high definition audio controller. In at least one embodiment, system 1200 includes an optional legacy I/O controller 1240 for coupling legacy (e.g., Personal System 2 (PS/2)) devices to system. In at least one embodiment, platform controller hub 1230 can also connect to one or more Universal Serial Bus (USB) controllers 1242 connect input devices, such as keyboard and mouse 1243 combinations, a camera 1244, or other USB input devices.

In at least one embodiment, an instance of memory controller 1216 and platform controller hub 1230 may be integrated into a discreet external graphics processor, such as external graphics processor 1212. In at least one embodiment, platform controller hub 1230 and/or memory controller 1216 may be external to one or more processor(s) 1202. For example, in at least one embodiment, system 1200 can include an external memory controller 1216 and platform controller hub 1230, which may be configured as a memory controller hub and peripheral controller hub within a system chipset that is in communication with processor(s) 1202.

Inference and/or training logic 815 are used to perform inferencing and/or training operations associated with one or more embodiments. Details regarding inference and/or training logic 815 are provided below in conjunction with FIGS. 8A and/or 8B. In at least one embodiment portions or all of inference and/or training logic 815 may be incorporated into graphics processor 1200. For example, in at least one embodiment, training and/or inferencing techniques described herein may use one or more of ALUs embodied in graphics processor 1212. Moreover, in at least one embodiment, inferencing and/or training operations described herein may be done using logic other than logic illustrated in FIG. 8A or 8B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Figure 13:
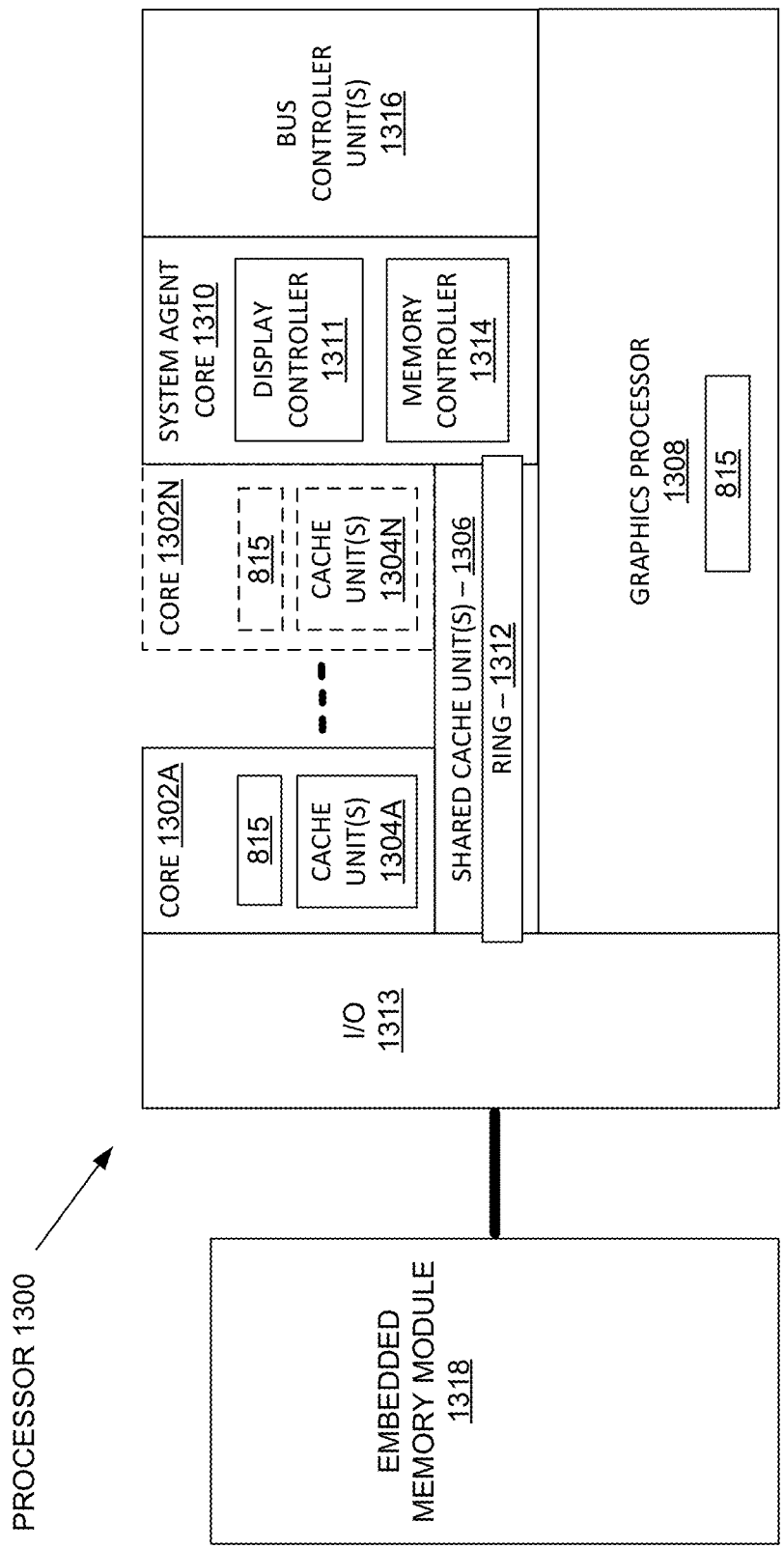
FIG. 13 illustrates at least a portion of a graphics processor, according to one or more embodiments.

FIG. 13 is a block diagram of a processor 1300 having one or more processor cores 1302A-1302N, an integrated memory controller 1314, and an integrated graphics processor 1308, according to at least one embodiment. In at least one embodiment, processor 1300 can include additional cores up to and including additional core 1302N represented by dashed lined boxes. In at least one embodiment, each of processor cores 1302A-1302N includes one or more internal cache units 1304A-1304N. In at least one embodiment, each processor core also has access to one or more shared cached units 1306.

In at least one embodiment, internal cache units 1304A-1304N and shared cache units 1306 represent a cache memory hierarchy within processor 1300. In at least one embodiment, cache memory units 1304A-1304N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1306 and 1304A-1304N.

In at least one embodiment, processor 1300 may also include a set of one or more bus controller units 1316 and a system agent core 1310. In at least one embodiment, one or more bus controller units 1316 manage a set of peripheral buses, such as one or more PCI or PCI express busses. In at least one embodiment, system agent core 1310 provides management functionality for various processor components. In at least one embodiment, system agent core 1310 includes one or more integrated memory controllers 1314 to manage access to various external memory devices (not shown).

In at least one embodiment, one or more of processor cores 1302A-1302N include support for simultaneous multi-threading. In at least one embodiment, system agent core 1310 includes components for coordinating and operating cores 1302A-1302N during multi-threaded processing. In at least one embodiment, system agent core 1310 may additionally include a power control unit (PCU), which includes logic and components to regulate one or more power states of processor cores 1302A-1302N and graphics processor 1308.

In at least one embodiment, processor 1300 additionally includes graphics processor 1308 to execute graphics processing operations. In at least one embodiment, graphics processor 1308 couples with shared cache units 1306, and system agent core 1310, including one or more integrated memory controllers 1314. In at least one embodiment, system agent core 1310 also includes a display controller 1311 to drive graphics processor output to one or more coupled displays. In at least one embodiment, display controller 1311 may also be a separate module coupled with graphics processor 1308 via at least one interconnect, or may be integrated within graphics processor 1308.

In at least one embodiment, a ring based interconnect unit 1312 is used to couple internal components of processor 1300. In at least one embodiment, an alternative interconnect unit may be used, such as a point-to-point interconnect, a switched interconnect, or other techniques. In at least one embodiment, graphics processor 1308 couples with ring interconnect 1312 via an I/O link 1313.

In at least one embodiment, I/O link 1313 represents at least one of multiple varieties of I/O interconnects, including an on package I/O interconnect which facilitates communication between various processor components and a high-performance embedded memory module 1318, such as an eDRAM module. In at least one embodiment, each of processor cores 1302A-1302N and graphics processor 1308 use embedded memory modules 1318 as a shared Last Level Cache.

In at least one embodiment, processor cores 1302A-1302N are homogenous cores executing a common instruction set architecture. In at least one embodiment, processor cores 1302A-1302N are heterogeneous in terms of instruction set architecture (ISA), where one or more of processor cores 1302A-1302N execute a common instruction set, while one or more other cores of processor cores 1302A-13-02N executes a subset of a common instruction set or a different instruction set. In at least one embodiment, processor cores 1302A-1302N are heterogeneous in terms of microarchitecture, where one or more cores having a relatively higher power consumption couple with one or more power cores having a lower power consumption. In at least one embodiment, processor 1300 can be implemented on one or more chips or as an SoC integrated circuit.

Inference and/or training logic 815 are used to perform inferencing and/or training operations associated with one or more embodiments. Details regarding inference and/or training logic 815 are provided below in conjunction with FIGS. 8A and/or 8B. In at least one embodiment portions or all of inference and/or training logic 815 may be incorporated into processor 1300. For example, in at least one embodiment, training and/or inferencing techniques described herein may use one or more of ALUs embodied in graphics processor 1212, graphics core(s) 1302A-1302N, or other components in FIG. 13. Moreover, in at least one embodiment, inferencing and/or training operations described herein may be done using logic other than logic illustrated in FIG. 8A or 8B. In at least one embodiment, weight parameters may be stored in on-chip or off-chip memory and/or registers (shown or not shown) that configure ALUs of graphics processor 1300 to perform one or more machine learning algorithms, neural network architectures, use cases, or training techniques described herein.

Virtualized Computing Platform

Embodiments are disclosed related a virtualized computing platform for advanced computing, such as image inferencing and image processing in medical applications. Without limitation, embodiments may include radiography, magnetic resonance imaging (MRI), nuclear medicine, ultrasound, sonography, elastography, photoacoustic imaging, tomography, echocardiography, functional near-infrared spectroscopy, and magnetic particle imaging, or a combination thereof. In at least one embodiment, a virtualized computing platform and associated processes described herein may additionally or alternatively be used, without limitation, in forensic science analysis, sub-surface detection and imaging (e.g., oil exploration, archaeology, paleontology, etc.), topography, oceanography, geology, osteology, meteorology, intelligent area or object tracking and monitoring, sensor data processing (e.g., RADAR, SONAR, LIDAR, etc.), and/or genomics and gene sequencing.

Figure 14:
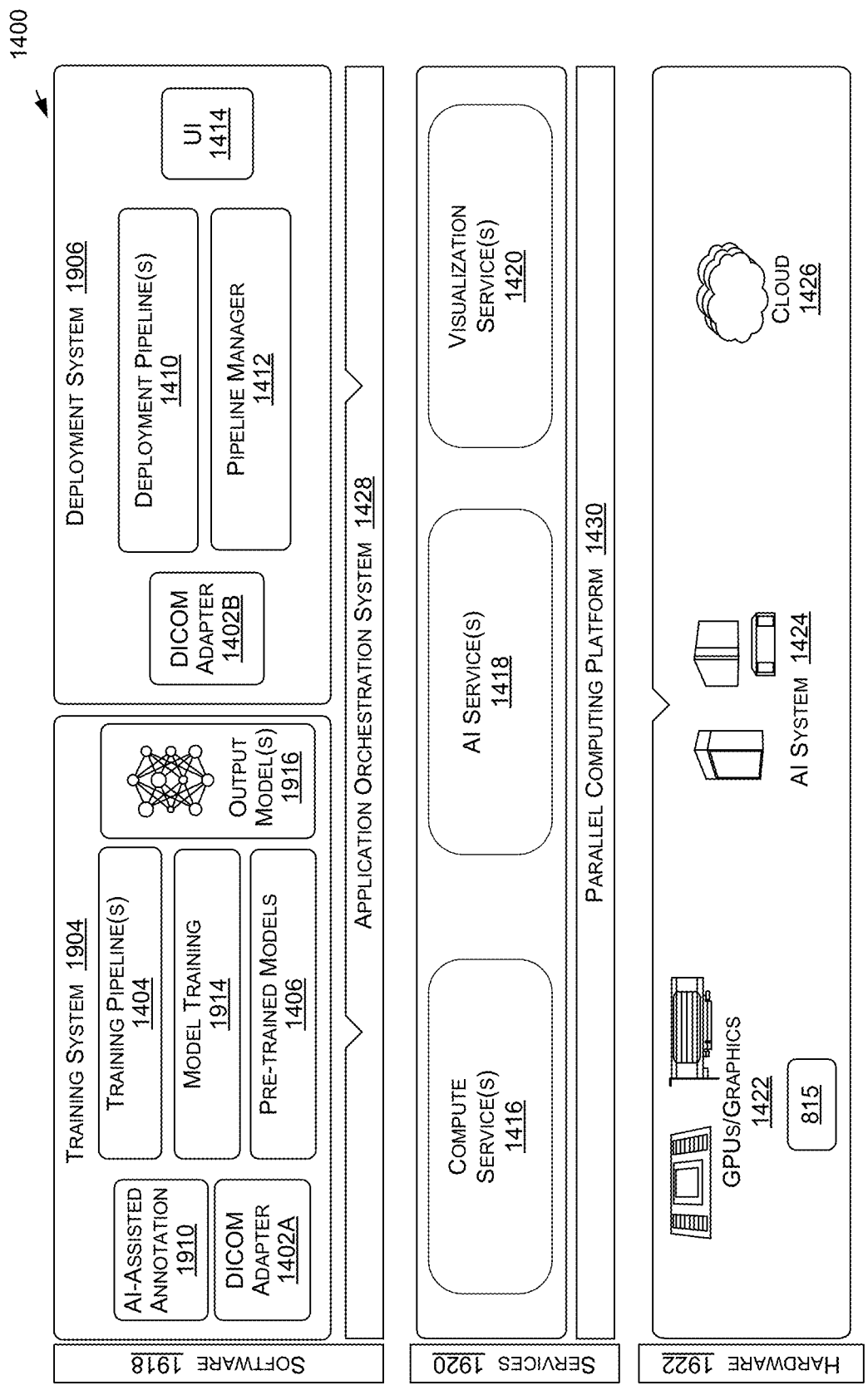
FIG. 14 is a system diagram for an example system for training, adapting, instantiating and deploying machine learning models in an advanced computing pipeline, in accordance with at least one embodiment.

FIG. 14 is a system diagram for an example system 1400 for generating and deploying an imaging deployment pipeline, in accordance with at least one embodiment. In at least one embodiment, system 1400 may implemented in a cloud computing environment (e.g., using cloud 1426). In at least one embodiment, system 1400 may be implemented locally with respect to a healthcare services facility, or as a combination of both cloud and local computing resources. In at least one embodiment, in embodiments where cloud computing is implemented, patient data may be separated from, or unprocessed by, by one or more components of system 1400 that would render processing non-compliant with HIPAA and/or other data handling and privacy regulations or laws. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system may execute training pipelines 1404. In at least one embodiment, where one or more machine learning models are to be used in deployment pipelines 1410 by deployment system, training pipelines 1404 may be used to train or retrain one or more (e.g. pre-trained) models, and/or implement one or more of pre-trained models 1406 (e.g., without a need for retraining or updating). In at least one embodiment, as a result of training pipelines 1404, output model(s) may be generated. In at least one embodiment, training pipelines 1404 may include any number of processing steps, such as but not limited to imaging data (or other input data) conversion or adaption (e.g., using DICOM adapter 1402A to convert DICOM images to another format suitable for processing by respective machine learning models, such as Neuroimaging Informatics Technology Initiative (NIfTI) format), AI-assisted annotation, labeling or annotating of imaging data to generate labeled clinic data, model selection from a model registry, model training, training, retraining, or updating models, and/or other processing steps. In at least one embodiment, for different machine learning models used by deployment system, different training pipelines 1404 may be used. In at least one embodiment, training pipeline 1404 s may be used for a first machine learning model, training pipeline 1404 may be used for a second machine learning model, and training pipeline 1404 may be used for a third machine learning model. In at least one embodiment, any combination of tasks within training system may be used depending on what is required for each respective machine learning model. In at least one embodiment, one or more of machine learning models may already be trained and ready for deployment so machine learning models may not undergo any processing by training system, and may be implemented by deployment system.

In at least one embodiment, output model(s) and/or pre-trained model(s) may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 15A:
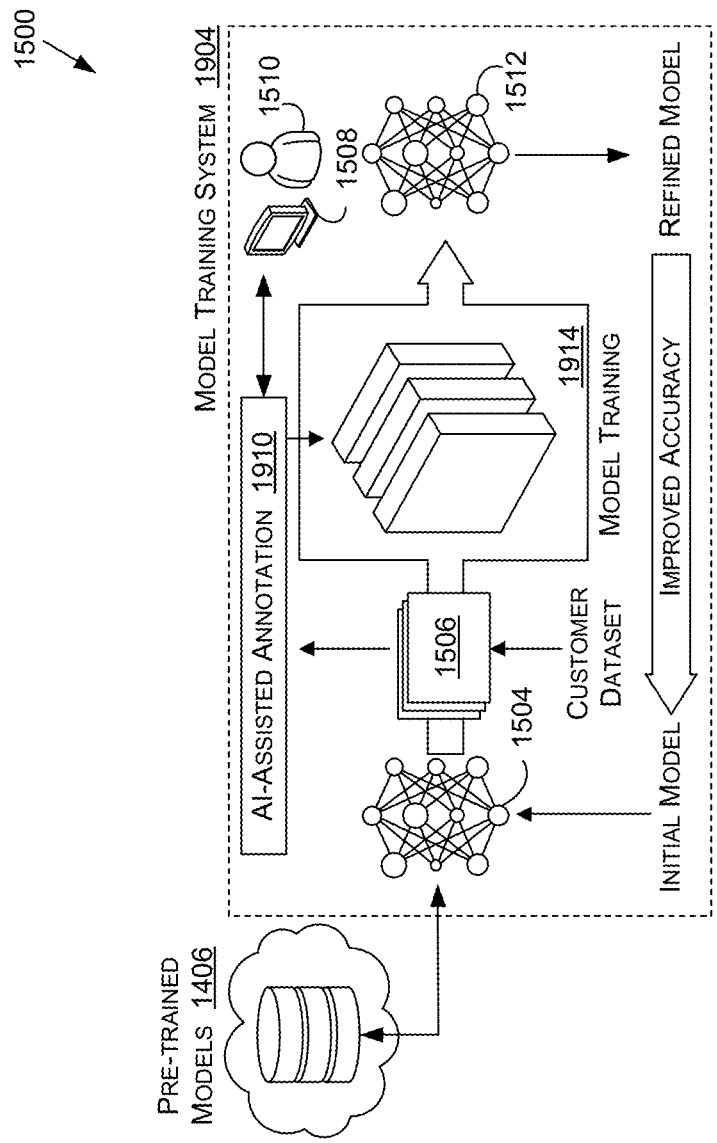
FIG. 15A illustrates a data flow diagram for a process to train a machine learning model, in accordance with at least one embodiment.

In at least one embodiment, training pipelines 1404 may include AI-assisted annotation, as described in more detail herein with respect to at least FIG. 15B. In at least one embodiment, labeled clinic data (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data (or other data type used by machine learning models), there may be corresponding ground truth data generated by training system. In at least one embodiment, AI-assisted annotation may be performed as part of deployment pipelines 1410; either in addition to, or in lieu of AI-assisted annotation included in training pipelines 1404. In at least one embodiment, system 1400 may include a multi-layer platform that may include a software layer of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data (e.g., DICOM data, RIS data, raw data, CIS data, REST compliant data, RPC data, raw data, etc.) from PACS servers (e.g., via a DICOM adapter 1402, or another data type adapter such as RIS, CIS, REST compliant, RPC, raw, etc.) to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s). In at least one embodiment, applications may then call or execute one or more services for performing compute, AI, or visualization tasks associated with respective applications, and software and/or services may leverage hardware to perform processing tasks in an effective and efficient manner.

In at least one embodiment, a deployment system may execute deployment pipelines 1410. In at least one embodiment, deployment pipelines 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1410 depending on information desired from data generated by a device. In at least one embodiment, where detections of anomalies are desired from an MRI machine, there may be a first deployment pipeline 1410, and where image enhancement is desired from output of an MRI machine, there may be a second deployment pipeline 1410.

In at least one embodiment, applications available for deployment pipelines 1410 may include any application that may be used for performing processing tasks on imaging data or other data from devices. In at least one embodiment, different applications may be responsible for image enhancement, segmentation, reconstruction, anomaly detection, object detection, feature detection, treatment planning, dosimetry, beam planning (or other radiation treatment procedures), and/or other analysis, image processing, or inferencing tasks. In at least one embodiment, a deployment system may define constructs for each of applications, such that users of a deployment system (e.g., medical facilities, labs, clinics, etc.) may understand constructs and adapt applications for implementation within their respective facility. In at least one embodiment, an application for image reconstruction may be selected for inclusion in deployment pipeline 1410, but data type generated by an imaging device may be different from a data type used within an application. In at least one embodiment, DICOM adapter 1402B (and/or a DICOM reader) or another data type adapter or reader (e.g., RIS, CIS, REST compliant, RPC, raw, etc.) may be used within deployment pipeline 1410 to convert data to a form useable by an application within deployment system. In at least one embodiment, access to DICOM, RIS, CIS, REST compliant, RPC, raw, and/or other data type libraries may be accumulated and pre-processed, including decoding, extracting, and/or performing any convolutions, color corrections, sharpness, gamma, and/or other augmentations to data. In at least one embodiment, DICOM, RIS, CIS, REST compliant, RPC, and/or raw data may be unordered and a pre-pass may be executed to organize or sort collected data. In at least one embodiment, because various applications may share common image operations, in some embodiments, a data augmentation library may be used to accelerate these operations. In at least one embodiment, to avoid bottlenecks of conventional processing approaches that rely on CPU processing, parallel computing platform 1430 may be used for GPU acceleration of these processing tasks.

In at least one embodiment, an image reconstruction application may include a processing task that includes use of a machine learning model. In at least one embodiment, a user may desire to use their own machine learning model, or to select a machine learning model from a model registry. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400 deployment pipelines 1410 may be even more user friendly, provide for easier integration, and produce more accurate, efficient, and timely results.

In at least one embodiment, a deployment system may include a user interface 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system. In at least one embodiment, although not illustrated with respect to training system, user interface 1414 (or a different user interface) may be used for selecting models for use in deployment system, for selecting models for training, or retraining, in training system, and/or for otherwise interacting with training system.

In at least one embodiment, pipeline manager 1412 may be used, in addition to an application orchestration system 1428, to manage interaction between applications or containers of deployment pipeline(s) 1410 and services and/or hardware. In at least one embodiment, pipeline manager 1412 may be configured to facilitate interactions from application to application, from application to service, and/or from application or service to hardware. In at least one embodiment, although illustrated as included in software, this is not intended to be limiting, and in some examples pipeline manager 1412 may be included in services. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services leveraged by and shared by applications or containers in deployment system may include compute services 1416, AI services 1418, visualization services 1420, and/or other service types. In at least one embodiment, applications may call (e.g., execute) one or more of services to perform processing operations for an application. In at least one embodiment, compute services 1416 may be leveraged by applications to perform supercomputing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may enable general purpose computing on GPUs (GPGPU) (e.g., GPUs 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1418 may be leveraged to perform inferencing services for executing machine learning model(s) associated with applications (e.g., tasked with performing one or more processing tasks of an application). In at least one embodiment, AI services 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output models from a training system and/or other models of applications to perform inference on imaging data (e.g., DICOM data, RIS data, CIS data, REST compliant data, RPC data, raw data, etc.). In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources based on priority paths for different inferencing tasks of AI services 1418.

In at least one embodiment, shared storage may be mounted to AI services 1418 within system 1400. In at least one embodiment, shared storage may operate as a cache (or other storage device type) and may be used to process inference requests from applications. In at least one embodiment, when an inference request is submitted, a request may be received by a set of API instances of a deployment system, and one or more instances may be selected (e.g., for best fit, for load balancing, etc.) to process a request. In at least one embodiment, to process a request, a request may be entered into a database, a machine learning model may be located from a model registry if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization services 1420 may be leveraged to generate visualizations for viewing outputs of applications and/or deployment pipeline(s) 1410. In at least one embodiment, GPUs 1422 may be leveraged by visualization services 1420 to generate visualizations. In at least one embodiment, rendering effects, such as ray-tracing, may be implemented by visualization services 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1420 may include an internal visualizer, cinematics, and/or other rendering or image processing capabilities or functionality (e.g., ray tracing, rasterization, internal optics, etc.).

In at least one embodiment, hardware may include GPUs 1422, AI system 1424, cloud 1426, and/or any other hardware used for executing training system and/or deployment system. In at least one embodiment, GPUs 1422 (e.g., NVIDIA's TESLA and/or QUADRO GPUs) may include any number of GPUs that may be used for executing processing tasks of compute services 1416, AI services 1418, visualization services 1420, other services, and/or any of features or functionality of software. For example, with respect to AI services 1418, GPUs 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs 1422. In at least one embodiment, cloud 1426 may include a GPU-optimized platform for deep learning tasks. In at least one embodiment, AI system 1424 may use GPUs, and cloud 1426— or at least a portion tasked with deep learning or inferencing—may be executed using one or more AI systems 1424. As such, although hardware is illustrated as discrete components, this is not intended to be limiting, and any components of hardware may be combined with, or leveraged by, any other components of hardware.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system(s) 1424 for performing one or more of AI-based tasks of system 1400 (e.g., as a hardware abstraction and scaling platform). In at least one embodiment, cloud 1426 may integrate with application orchestration system 1428 leveraging multiple GPUs to enable seamless scaling and load balancing between and among applications and services. In at least one embodiment, cloud 1426 may tasked with executing at least some of services of system 1400, including compute services 1416, AI services 1418, and/or visualization services 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

In at least one embodiment, in an effort to preserve patient confidentiality (e.g., where patient data or records are to be used off-premises), cloud 1426 may include a registry—such as a deep learning container registry. In at least one embodiment, a registry may store containers for instantiations of applications that may perform pre-processing, post-processing, or other processing tasks on patient data. In at least one embodiment, cloud 1426 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

In at least one embodiment, pre-trained models 1406 may be stored in a data store, or registry. In at least one embodiment, pre-trained models 1406 may have been trained, at least in part, at one or more facilities other than a facility executing process 1500. In at least one embodiment, to protect privacy and rights of patients, subjects, or clients of different facilities, pre-trained models 1406 may have been trained, on-premise, using customer or patient data generated on-premise. In at least one embodiment, pre-trained models 1406 may be trained using cloud 1426 and/or other hardware, but confidential, privacy protected patient data may not be transferred to, used by, or accessible to any components of cloud 1426 (or other off premise hardware). In at least one embodiment, where a pre-trained model 1406 is trained at using patient data from more than one facility, pre-trained model 1406 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1406 on-premise and/or off premise, such as in a datacenter or other cloud computing infrastructure.

In at least one embodiment, when selecting applications for use in deployment pipelines 1410, a user may also select machine learning models to be used for specific applications. In at least one embodiment, a user may not have a model for use, so a user may select a pre-trained model 1406 to use with an application. In at least one embodiment, pre-trained model 1406 may not be optimized for generating accurate results on customer dataset 1506 of a facility of a user (e.g., based on patient diversity, demographics, types of medical imaging devices used, etc.). In at least one embodiment, prior to deploying pre-trained model 1406 into deployment pipeline 1410 for use with an application(s), pre-trained model 1406 may be updated, retrained, and/or fine-tuned for use at a respective facility.

In at least one embodiment, a user may select pre-trained model 1406 that is to be updated, retrained, and/or fine-tuned, and pre-trained model 1406 may be referred to as initial model 1504 for training system within process 1500. In at least one embodiment, customer dataset 1506 (e.g., imaging data, genomics data, sequencing data, or other data types generated by devices at a facility) may be used to perform model training (which may include, without limitation, transfer learning) on initial model 1504 to generate refined model 1512. In at least one embodiment, ground truth data corresponding to customer dataset 1506 may be generated by training system. In at least one embodiment, ground truth data may be generated, at least in part, by clinicians, scientists, doctors, practitioners, at a facility.

In at least one embodiment, AI-assisted annotation may be used in some examples to generate ground truth data. In at least one embodiment, AI-assisted annotation (e.g., implemented using an AI-assisted annotation SDK) may leverage machine learning models (e.g., neural networks) to generate suggested or predicted ground truth data for a customer dataset. In at least one embodiment, user 1510 may use annotation tools within a user interface (a graphical user interface (GUI)) on computing device 1508.

In at least one embodiment, user 1510 may interact with a GUI via computing device 1508 to edit or fine-tune (auto)annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines 1410 at a facility for performing one or more processing tasks with respect to medical imaging data.

In at least one embodiment, refined model 1512 may be uploaded to pre-trained models 1406 in model registry to be selected by another facility. In at least one embodiment, his process may be completed at any number of facilities such that refined model 1512 may be further refined on new datasets any number of times to generate a more universal model.

FIG. 15B is an example illustration of a client-server architecture 1532 to enhance annotation tools with pre-trained annotation models, in accordance with at least one embodiment. In at least one embodiment, AI-assisted annotation tools 1536 may be instantiated based on a client-server architecture 1532. In at least one embodiment, annotation tools 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation, a deep learning model, for example, may receive this data as input and return inference results of a segmented organ or abnormality. In at least one embodiment, pre-instantiated annotation tools, such as AI-Assisted Annotation Tool 1536B in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542 (e.g., machine learning models, such as deep learning models) that are pre-trained to perform AI-assisted annotation on a particular organ or abnormality. These models may be further updated by using training pipelines 1404. In at least one embodiment, pre-installed annotation tools may be improved over time as new labeled clinic data is added.

Hardware structure(s) 815 are used to perform one or more embodiments. Details regarding hardware structure(s) 815 are provided below in conjunction with FIGS. 8A and/or 8B.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
receiving a collection of images of a scene;
determining single-view and multi-view depth data for the images of the collection;
inferring fused depth maps for the images of the scene using one or more neural networks that model a scale correction function by accepting the single view and multi-view depth data as input, wherein the one or more neural networks apply at least one weight parameter based at least in part on depth data for one or more static regions of the images of the collection, the depth data for the one or more static regions of the images of the collection determined based at least in part on a loss function; and
synthesizing an image of the scene for a determined view that is different from views of the images of the collection, the image synthesized using the fused depth maps and image features extracted from the images, based at least in part on a decoder applying at least one skip connection, in the one or more neural networks, between the image features and the depth data.

2. The computer-implemented method of claim 1, further comprising:
synthesizing the image of the scene using a neural network trained to blend foreground features from the single-view depth data with background features from the multi-view depth data.

3. The computer-implemented method of claim 2, further comprising:
causing the neural network to synthesize new image data for one or more regions for which data is not obtainable from the collection of images of the scene.

4. The computer-implemented method of claim 1, wherein the scene is a dynamic scene including a static background portion and at least one dynamic foreground portion in which at least one object was moving during capture of the collection of images.

5. The computer-implemented method of claim 1, wherein a point of view of at least one monocular camera capturing the collection of images changed during capture of the collection of images.

6. The computer-implemented method of claim 1, further comprising:
determining optical flow data for the collection of images; and
using the optical flow data as a constraint for the synthesizing.

7. The computer-implemented method of claim 1, further comprising:
synthesizing a plurality of images at determined times and for determined views of the scene; and
generating a video including video frames corresponding to the plurality of images.

8. The computer-implemented method of claim 1, further comprising:
inferring the fused depth maps using the one or more neural networks further completes the fused depths maps with locally consistent motions.

9. A system comprising:
one or more processors; and
memory including instructions that, when executed by the one or more processors, cause the system to:
receive a collection of images of a scene;
determine single-view and multi-view depth data for the images of the collection;
infer fused depth maps for the images of the scene using one or more neural networks that model a scale correction function by accepting the single view and multi-view depth data as input, wherein the one or more neural networks apply at least one weight parameter based at least in part on depth data for one or more static regions of the images of the collection the depth data for the one or more static regions of the images of the collection determined based at least in part on a loss function; and synthesize an image of the scene for a determined view that is different from views of the images of the collection, the image synthesized using the fused depth maps and image features extracted from the images, based at least in part on a decoder applying at least one skip connection, in the one or more neural networks, between the image features and the depth data.

10. The system of claim 9, wherein the instructions when executed further cause the system to:

synthesize the image of the scene using a neural network trained to blend foreground features from the single-view depth data with background features from the multi-view depth data.

11. The system of claim 10, wherein the instructions when executed further cause the system to:

cause the neural network to synthesize new image data for one or more regions for which data is not obtainable from the collection of images of the scene.

12. The system of claim 9, wherein the scene is a dynamic scene including a static background portion and at least one dynamic foreground portion in which at least one object was moving during capture of the collection of images.

13. The system of claim 9, wherein a point of view of at least one monocular camera capturing the collection of images changed during capture of the collection of images.

14. The system of claim 9, wherein the instructions when executed further cause the system to:

determine optical flow data for the collection of images; and use the optical flow data as a constraint for the synthesizing.

15. A non-transitory machine-readable medium having stored thereon a set of instructions, which if performed by one or more processors, cause the one or more processors to at least:

receive a collection of images of a scene;

determine single-view and multi-view depth data for the images of the collection;

infer fused depth maps for the images of the scene using one or more neural networks that model a scale correction function by accepting the single view and multi-view depth data as input, wherein the one or more neural networks apply at least one weight parameter based at least in part on depth data for one or more static regions of the images of the collection, the depth data for the one or more static regions of the images of the collection determined based at least in part on a loss function; and synthesize an image of the scene for a determined view that is different from views of the images of the collection, the image synthesized using the fused depth maps and image features extracted from the images, based at least in part on a decoder applying at least one skip connection, in the one or more neural networks, between the image features and the depth data.

16. The non-transitory machine-readable medium of claim 15, wherein the instructions if executed further cause the one or more processors to:

synthesize the image of the scene using a neural network trained to blend foreground features from the single-view depth data with background features from the multi-view depth data.

17. The non-transitory machine-readable medium of claim 16, wherein the instructions if executed further cause the one or more processors to:

cause the neural network to synthesize new image data for one or more regions for which data is not obtainable from the collection of images of the scene.

18. The non-transitory machine-readable medium of claim 15, wherein the scene is a dynamic scene including a static background portion and at least one dynamic foreground portion in which at least one object was moving during capture of the collection of images.

19. The non-transitory machine-readable medium of claim 15, wherein a point of view of at least one monocular camera capturing the collection of images changed during capture of the collection of images.

20. The non-transitory machine-readable medium of claim 15, wherein the instructions if executed further cause the one or more processors to:

determine optical flow data for the collection of images; and use the optical flow data as a constraint for the synthesizing.

* * * * *